US008450878B2

(12) United States Patent
Rada et al.

(10) Patent No.: US 8,450,878 B2
(45) Date of Patent: May 28, 2013

(54) METHODS AND APPARATUS FOR POWER FACTOR CORRECTION AND REDUCTION OF DISTORTION IN AND NOISE IN A POWER SUPPLY DELIVERY NETWORK

(75) Inventors: Patrick A. Rada, San Jose, CA (US); John H. Magnasco, San Jose, CA (US)

(73) Assignee: Geneva Cleantech, Inc., San Jose, CA (US)

( * ) Notice: Subject to any disclaimer, the term of this patent is extended or adjusted under 35 U.S.C. 154(b) by 477 days.

(21) Appl. No.: 12/694,153

(22) Filed: Jan. 26, 2010

(65) Prior Publication Data

US 2010/0187914 A1 Jul. 29, 2010

Related U.S. Application Data

(60) Provisional application No. 61/298,112, filed on Jan. 25, 2010, provisional application No. 61/298,127, filed on Jan. 25, 2010, provisional application No. 61/206,051, filed on Jan. 26, 2009, provisional application No. 61/206,072, filed on Jan. 26, 2009.

(51) Int. Cl.
*H02J 1/02* (2006.01)

(52) U.S. Cl.
USPC .......................................... 307/105

(58) Field of Classification Search
USPC .......................................... 307/105
See application file for complete search history.

(56) References Cited

U.S. PATENT DOCUMENTS

| | | | | |
|---|---|---|---|---|
| 4,013,937 A | * | 3/1977 | Pelly et al. | 363/10 |
| 4,429,270 A | | 1/1984 | Davies et al. | |
| 5,051,685 A | | 9/1991 | Sink | 323/208 |
| 5,231,347 A | | 7/1993 | Voisine et al. | 324/142 |
| 5,465,203 A | | 11/1995 | Bhattacharya et al. | 363/40 |
| 5,477,132 A | | 12/1995 | Canter et al. | |
| 5,499,178 A | | 3/1996 | Mohan | |
| 5,570,006 A | | 10/1996 | Woodworth | |
| 5,731,965 A | | 3/1998 | Cheng et al. | 363/41 |
| 5,977,660 A | * | 11/1999 | Mandalakas et al. | 307/105 |
| 6,075,350 A | * | 6/2000 | Peng | 323/207 |
| 6,147,475 A | | 11/2000 | Bridgeman | 323/211 |
| 6,331,765 B1 | | 12/2001 | Yamamoto et al. | 323/210 |
| 6,531,854 B2 | | 3/2003 | Hwang | 323/285 |
| 6,728,121 B2 | | 4/2004 | Ben-Yaakov et al. | 363/89 |
| 6,946,819 B2 | | 9/2005 | Fagnani et al. | 323/207 |
| 7,321,499 B2 | | 1/2008 | Halamik et al. | 363/21.1 |
| 7,324,361 B2 | | 1/2008 | Siri | |
| 7,382,112 B2 | | 6/2008 | Krein | 323/207 |
| 7,459,864 B2 | | 12/2008 | Lys | 315/291 |

(Continued)

OTHER PUBLICATIONS

Bibian, Stephan and Hua Jin, *Digital Control with Improved Performance for Boost Power Factor Correction Circuits*, Applied Power Electronics Conference and Exposition, 2001, IEEE vol. 1Mar. 4-8, 2001 pp. 137-143.

(Continued)

*Primary Examiner* — Robert L. Deberadinis
(74) *Attorney, Agent, or Firm* — Haverstock & Owens LLP

(57) ABSTRACT

Methods and apparatus for power factor correction include selectively coupling bit reactive loads with a load having dynamic reactive properties to dynamically correct a power factor. Methods and apparatus for reducing distortion in a power delivery system include a means for determining distortion in a power line, forming a corrective signal according to the distortion and selectively sinking and sourcing current to the power line according to the corrective signal.

27 Claims, 9 Drawing Sheets

U.S. PATENT DOCUMENTS

| | | | |
|---|---|---|---|
| 7,469,190 B2 | 12/2008 | Bickel | |
| 7,480,157 B1 | 1/2009 | Soeng | 363/21.01 |
| 7,489,116 B2 | 2/2009 | Lanni | 323/222 |
| 7,501,800 B2 | 3/2009 | Kim et al. | 323/207 |
| 7,538,525 B2 | 5/2009 | Kim et al. | 323/205 |
| 7,564,706 B1 | 7/2009 | Herbert | 363/124 |
| 7,606,639 B2 | 10/2009 | Miyaji | 700/296 |
| 7,616,455 B2 | 11/2009 | Cameron et al. | 363/16 |
| 7,633,782 B1 | 12/2009 | Herbert | 363/125 |
| 7,675,280 B2 | 3/2010 | Strijket | 323/285 |
| 8,134,346 B1* | 3/2012 | Huta et al. | 323/211 |
| 2007/0035975 A1 | 2/2007 | Dickerson et al. | |
| 2007/0274115 A1 | 11/2007 | Michaels et al. | 363/164 |
| 2008/0106241 A1 | 5/2008 | Deaver et al. | |
| 2008/0285318 A1 | 11/2008 | Tan et al. | 363/89 |
| 2009/0033296 A1* | 2/2009 | Hammerstrom | 323/207 |
| 2009/0073726 A1 | 3/2009 | Babcock | |
| 2009/0086520 A1 | 4/2009 | Nishimura | |
| 2009/0195349 A1 | 8/2009 | Frader-Thompson et al. | 340/3.1 |
| 2009/0322301 A1 | 12/2009 | Chang | 323/284 |
| 2010/0026096 A1 | 2/2010 | Yeh et al. | 307/39 |
| 2010/0037189 A1 | 2/2010 | Bickel | 716/4 |
| 2010/0052598 A1 | 3/2010 | Hayashi et al. | 318/759 |
| 2010/0060291 A1 | 3/2010 | Grommes | 324/537 |
| 2010/0060479 A1 | 3/2010 | Salter | 340/870.4 |
| 2010/0067271 A1 | 3/2010 | Garces et al. | 363/95 |
| 2010/0070213 A1 | 3/2010 | Anklam | 702/60 |
| 2010/0070216 A1 | 3/2010 | Murata | 702/61 |
| 2010/0070217 A1 | 3/2010 | Shimada et al. | 702/62 |
| 2010/0070218 A1 | 3/2010 | Hyde et al. | 702/62 |
| 2010/0070225 A1 | 3/2010 | Hyde et al. | 702/76 |
| 2010/0070227 A1 | 3/2010 | Hyde et al. | 702/77 |
| 2010/0070785 A1 | 3/2010 | Fallin et al. | 713/320 |

OTHER PUBLICATIONS

Chen, Jingquan, Aleksandar Prodic, Robert Erickson, and Dragan Maksimovic, *Predictive Digital Current Programmed Control*, IEEE Transactions on Power Electronics, vol. 18, No. 1, Jan. 2003, pp. 411-419.

Dixon, L., *High Power Factor Preregulator for Off-Line Power Supplies*, Unitrode Corporation (Texas Instruments) Power Supply Design Seminar Topics SEM600, 1988, pp. 6-1-6-16.

Erickson, R. et al., *Design of a Simple High-Power-Factor Rectifier Based on the Flyback Converter*, Proceedings of IEEE Applied Power Electronics Conference, Mar. 1990, pp. 792-801.

*Linear Technoloyg LT1103/LT1105 Offline Switching Regulator*, Linear Technology Corporation, 1992, pp. 1-32, <URL: http://www.linear.com/pdf/11035fd.pdf>.

*Linear Technology LT1715 General Purpose Isolated Flyback Controller*, Linear Technology Corporation, 2000, pp. 1-28, <URL: http://www.linear.com/pdf/1725fd.pdf>.

Murphy, P. et al., *Digital Control of Power Factor Correction*, Department of Electrical and Computer Engineering, NC A&T State University, Virginia Tech, CPES Seminar 2003, pp. 341-347, Apr. 27-29, 2003, Blacksburg, VA.

*NCP 1651 Product Review, Single Stage Power Factor Controller*, Semiconductor Components Industries, LLC, Apr. 2002, pp. 1-28, Rev.1.

*NCP 1651—Single Stage Power Factor Control*, Semiconductor Components Industries, LLC, Oct. 2003, pp. 1-32, Rev. 5.

Zhang, Wanfeng et al., *Analysis and Implementation of a New PFC Digital Control Method*, IEEE Power Elect. Conf., Mexico, Jun. 15, 2003, pp. 335-341.

Zhang, W. et al., *A New Power Factor Correction (PFC) Control Method Suitable for Low Cost DSP*, IEEE, International Telecommunications Energy Conference, Sep. 29-Oct. 3, 2002, pp. 407-417.

Zhang, Wanfeng, et al., *A New Predictive Control Strategy for Power Factor Correction*, $18^{th}$ IEEE, Feb. 9, 2003, pp. 403-409.

Zhang, W. et al., *DSP Implementation of Predictive Control Strategy for Power Factor Correction (PFC)*, IEEE, Applied Power Electronics Conference and Exposition, Feb. 22-26, 2004, pp. 67-73, vol. 1.

*AND8114/D-90W, Universal Input, Single Stage, PFC Converter*, Semiconductor Components Industries LLC, Dec. 2003, pp. 1-10, <URL: http://www.onsemiconductor.com/pub/Collateral/AND8124-D.pdf>.

International Search Report and Written Opinion dated Mar. 24, 2010, PCT/US2010/022141, Filed Jan. 26, 2010, Geneva CleanTech Inc.

International Search Report and Written Opinion dated Mar. 31, 2011, PCT/US2011/022471, Filed Jan. 25, 2011, Geneva CleanTech Inc.

\* cited by examiner

METHODS AND APPARATUS FOR POWER FACTOR CORRECTION AND REDUCTION OF DISTORTION IN AND NOISE IN A POWER SUPPLY DELIVERY NETWORK

CROSS-REFERENCE TO RELATED APPLICATIONS

This application claims the benefit of U.S. Provisional Patent Application Ser. Nos. 61/206,051, filed Jan. 26, 2009 and entitled "POWER FACTOR AND HARMONIC CORRECTION METHODS," 61/206,072 filed Jan. 26, 2009 and entitled "ENERGY USAGE MONITORING WITH REMOTE DISPLAY AND AUTOMATIC DETECTION OF APPLIANCE INCLUDING GRAPHICAL USER INTERFACE," 61/298,127 filed Jan. 25, 2010 and entitled "POWER FACTOR AND HARMONIC CORRECTION METHODS," and 61/298,112 filed Jan. 25, 2010 and titled "ENERGY USAGE MONITORING WITH REMOTE DISPLAY AND AUTOMATIC DETECTION OF APPLIANCE INCLUDING GRAPHICAL USER INTERFACE," under 35 U.S.C. §119(e), and U.S. Non-provisional patent application Ser. No. 12/694,171, filed Jan. 26, 2010, by inventors Patrick A. Rada and John H. Magnasco, and titled "ENERGY USAGE MONITORING WITH REMOTE DISPLAY AND AUTOMATIC DETECTION OF APPLIANCE INCLUDING GRAPHICAL USER INTERFACE," and are hereby incorporated by reference in its entirety for all purposes.

FIELD OF THE INVENTION

The present invention relates to the field of power electronics. More specifically, the present invention relates to reducing distortion and noise of power delivered to or generated by a load and improving power factor.

BACKGROUND OF THE INVENTION

Power factor correction is an important component of increasing efficiency of modern day power delivery systems. Due to reactive components in the loads that consume power such as appliances that include a motor, a phase shift develops between a current and a voltage component of a power signal. The power factor of an AC electric power system is defined as the ratio of the real power flowing to the load to the apparent power and is a number between 0 and 1 (frequently expressed as a percentage, e.g. 0.5 pf=50% pf). Real power (P) is the capacity of the circuit for performing work in a particular time. Apparent power (S) is the product of the current and voltage of the circuit. The Reactive Power (Q) is defined as the square root of the difference of the squares of S and P. Where reactive loads are present, such as with capacitors or inductors, energy storage in the loads result in a time difference between the current and voltage waveforms. During each cycle of the AC voltage, extra energy, in addition to any energy consumed in the load, is temporarily stored in the load in electric or magnetic fields, and then returned to the power grid a fraction of a second later in the cycle. The "ebb and flow" of this nonproductive power increases the current in the line. Thus, a circuit with a low power factor will use higher currents to transfer a given quantity of real power than a circuit with a high power factor. A linear load does not change the shape of the waveform of the current, but may change the relative timing (phase) between voltage and current. Generally, methods and apparatus to correct power factor have involved coupling a fixed corrective load having a known reactive value to a power line. The fixed capacitive reactive load counteracts the reactive effect of inductive loads vice versa, improving the power factor of the line. However, a fixed reactive load is only able to correct the power factor of a power line by a fixed amount to a certain extent because the power factor may be dynamic due to the changing nature of loads that are coupled and decoupled to the power line. To that end, later developments included several fixed reactive loads that may be selectively coupled to a power line in order to correct power factor. However, such systems require monitoring by an operator who must continually monitor the power factor in order to couple and decouple fixed reactive loads in order to counteract the ever changing power factor of the power line.

The changing landscape of electronics has introduced other inefficiencies in the delivery of power. The increased use of personal electrical appliances has caused an increase in the use of wall mounted AC-DC converters to supply power to devices and recharge the batteries of everyday items such as laptops, cellular telephones, cameras, and the like. The ubiquity of such items has caused users to have several of these converters, known as "wall warts" to be coupled into power systems. The two most common AC-DC converters are known as linear converters and switched mode converters. Linear converters utilize a step down transformer to step down the standard 120V power available in US residences to a desired AC voltage. A bridge rectifier rectifies that voltage. The bridge rectifier is generally coupled to a capacitor. Generally, this capacitor is of a high value. The capacitor forms a counter electromotive force. The capacitor forms a near DC voltage as it is charged and discharged. However, as it is charged, the capacitor draws current only a fraction of the cycle by the non linear bridge rectifier. As a result, the current waveform does not match the voltage and contains a heavy harmonic distortion component. Total harmonic distortion (THD) is the sum of the powers of all harmonic components to the power of the fundamental frequency. This harmonic distortion may be reflected back into the power network.

A switching power supply works on a different principle but also injects harmonics into a power delivery network. In general, a switched mode power supply operates by rectifying the 120V voltage available in US residences. The rectification against a counter electro motive force, such as a big reservoir capacitor, again adds harmonics and distortion. Also, the widespread adaptation of various types of linear or switch mode integrated circuits cause the system to create electrical noise. Furthermore, reactive components in the alternating current network degrades power factor, and integrated circuits cause harmonics and noise to be reflected into the power line. These harmonics manifest as harmonic distortion in the current component of a power signal. Because the power network has a nonzero impedance, distortion along the current component may also translate to amplitude distortion. Amplitude distortion is distortion occurring in a system, subsystem, or device when the output amplitude is not a linear function of the input amplitude under specified conditions. Other undesirable effects are also formed, such as power factor distortion and overall reduction of energy transfer. Such effects decrease efficiency and reduce quality in the delivery of power. To that end, what is needed are methods and apparatus capable of not only correcting a power factor in a power delivery network, but also reducing or eliminating distortion in a power line, thereby allowing for maximum efficiency and quality in power delivery. As a result, overall energy consumption may be reduced.

SUMMARY OF THE INVENTION

The invention provided herein allows for increasing efficiency and quality of power delivery over a power network to a load. The person of ordinary skill having the benefit of this disclosure will appreciate that the methods and apparatus discussed herein may be applied to a great variety of loads having reactive and non linear components that cause a less than perfect power factor and cause distortion and noise and the like to be injected back into the power network. In some applications, the load is a family residence. The load is a parallel combination of all appliances drawing power within the residence. To the grid, through a power meter, the residence appears to be one dynamic load having changing reactive and non linear properties as users within the residence activate and deactivate appliances. Advantageously, the invention provided herein overcomes prior art solutions inherent drawbacks such as prohibitive cost, complicated installation at multiple locations, fixed PF compensation that may over or under compensate and reduce PF, and poor performance. The invention provided herein is able to correct a power factor to a load by dynamically measuring a reactive power component of the load, and coupling at least one corrective reactive load. As the reactive power changes, such as when a washing machine is activated, the invention is able to recognize that the characteristic of the load has changed, and is able to couple or decouple other corrective reactive loads to the load causing the poor power factor. Furthermore, the invention provided herein is able to correct distortion, noise, and the like in the power delivered by a network to a load, thereby improving the quality of the power. The invention provides for comparing an electrical signal having distortion, noise, or the like to a reference signal. The electrical signal may be the current component of the power delivered to a load through a network. The reference signal may be derived from a voltage component of the power delivered to a load, or be synthesized separately but synchronized with the voltage waveform. A corrective signal is derived by comparing, or subtracting, the reference signal from the signal having distortion. The corrective signal comprises the distortion. Current is sunk or sourced from the signal having distortion according to the corrective signal, resulting in reduced distortion. Advantageously, the invention is able to correct distortion caused by all non linear loads in a residence at one point. The invention is able to be coupled between a utility meter and the residence. As a result, the invention is agnostic to the number of appliances in the residence, their location, or any other parameter. Also, the invention is energy efficient since it improves distortion and PF as necessary without increasing PF or distortion and without the addition of any other electrical load within the property network.

In one aspect of the invention, a method of reducing distortion in an electrical signal having distortion comprises sensing a distortion in the electrical signal having distortion and combining a factor of the distortion with the electrical signal having distortion. In some embodiments, the sensing step comprises comparing the electrical signal having distortion to a reference signal to obtain a difference signal and scaling the difference signal to form the factor of the distortion. The combining step comprises subtracting the factor of the distortion from the electrical signal having distortion if the factor of the distortion is positive and adding the factor of the distortion to the electrical signal having distortion if the factor of the distortion is negative. In some embodiments, the subtracting step comprises applying the factor of the distortion to a first controlled current source coupled to the electrical signal having distortion and the adding step comprises applying the factor of the distortion to a second controlled current source coupled to the electrical signal having distortion. Applying the factor of the distortion to a first controlled current source further comprises applying a power factor corrected positive power signal to the first controlled current source and applying the factor of the distortion to a second controlled current source further comprises applying a power factor corrected negative power signal to the second controlled current source.

In some embodiments, the combining step comprises modulating the factor of the distortion. The factor of the distortion is then added to the electrical signal having distortion if the factor of the distortion is negative and subtracting the factor of the distortion from the electrical signal having Distortion if the factor of the distortion is positive. The adding and subtracting step are able to be achieved by applying the factor of the distortion to a first switch coupled to the electrical signal having Distortion and applying the factor of the distortion to a second switch coupled to the electrical signal having Distortion. Modulating the factor of distortion can include pulse width modulation, delta-sigma modulation, pulse code modulation, pulse density modulation, or pulse position modulation. Applying the factor of the distortion to a first switch includes applying a power factor corrected positive power signal to the first switch and applying the factor of the distortion to a second switch includes applying a power factor corrected negative power signal to the second switch. Advantageously, the use of modulation techniques allows for highly efficient control of the switches. In some embodiments, analog or digital filters may be included for filtering away the modulating signal.

In some applications, an impedance of the power network may be far lower than the impedance of the load that the power network is delivering power to. In such circumstances, it will be appreciated by persons having the benefit of this disclosure that the direction of sourcing or sinking current may need to be reversed. By way of example, a negative distortion is regularly corrected by injecting or sourcing current into the power line. However, if the impedance of the load is greater than the impedance of the network, the current will be injected into the network rather than the load. As a result, the opposite function may be done. This leads to adequate distortion correction of the total current waveform drawn from the grid.

In another aspect of the invention, a method for reducing distortion in a power line comprises correcting a power factor in the power line such that the power factor is substantially one, comparing a current portion of the power line to a desired reference signal, thereby forming a corrective signal, and selectively sinking and sourcing current to the power line according to the corrective signal. Correcting a power factor comprises any known method of power factor correction or any method described herein. In some embodiments, selectively sinking or sourcing current comprises applying the corrective signal to at least one controlled current source, wherein the controlled current source couples a current supply with the power line according to the corrective signal. Alternatively, selectively sinking or sourcing current comprises modulating the corrective signal and applying the modulated corrective signal to at least one switch, wherein the switch couples a current supply with the power line and filtering modulation noise. Modulating the corrective signal comprises any among pulse width modulation, delta-sigma modulation, pulse code modulation, pulse density modulation, or pulse position modulation.

In some applications, an impedance of the power network may be far lower than the impedance of the load that the power network is delivering power to. In such circumstances, it will be appreciated by persons having the benefit of this disclosure that the direction of sourcing or sinking current may need to be reversed. By way of example, a negative distortion is regularly corrected by injecting or sourcing current into the power line. However, if the impedance of the load is greater than the impedance of the network, the current will be injected into the network rather than the load. As a result, the opposite function may be done. This leads to adequate distortion correction of the total current waveform drawn from the grid.

In operation, distortion in electrical signals, such as the power being delivered to a residence, is reduced. The distortion may be harmonic distortion, amplitude distortion, noise, elevated spectral noise, or the like. The power being delivered to a residence comprises a voltage and a current. Generally, the current component of the power delivered to a load will display distortion due to non linearities in the load. The distortion is able to be ascertained by comparing the current to a perfect sine wave, such as the voltage component of the power. This perfect sine wave is able to function as a reference signal. In cases where the voltage sinewave is less than perfect, such as when amplitude distortion has distorted the voltage sinewave, a near perfect sinewave is able to be created locally by synchronizing with the voltage sinewave. For example, zero crossing transitions may be utilized as markers to form a near perfect sinewave. By subtracting the reference signal from the signal having distortion, a corrective signal is formed. The corrective signal comprises a factor of the distortion. A positive portion of the distortion is applied to a current sink coupled to the lines delivering power to the residence. The current sink sinks current out of the line according to the distortion. Similarly, a negative portion of the distortion is applied to a current source that is also coupled to the lines delivering power to the residence. When the distortion is negative, the current source sources current into the line according to the distortion. As a result, the distortion is removed from the current being drawn from the grid.

In some embodiments, the corrective signal may be modulated in order to enhance efficiency. Methods such as pulse width modulation, delta-sigma modulation, pulse code modulation, pulse density modulation, or pulse position modulation. The modulated corrective signal is applied to an active switch, such as a MOSFET, that conducts current into or away from the line providing power to the house according to the distortion.

In some embodiments, the method of reducing distortion further comprises correcting a power factor. A method of dynamic power factor correction comprises determining the reactive power of the first load, determining a power factor resulting from that reactive power, determining an optimum corrective reactive load to be coupled to the first load to bring the ratio to substantially one and coupling the optimum corrective reactive load to the first load.

In some embodiments, coupling the optimum reactive load to the first load includes selecting a quantization level for a desired accuracy, the quantization level having an MSB and an LSB, determining an MSB reactive load determining an LSB reactive load, and closing switches associated with any bit required to achieve the desired accuracy, wherein the switches electrically couple any among the MSB reactive load and LSB reactive load to the first load. Generally, the desired accuracy comprises determining an acceptable value for the ratio. The quantization level is able to further comprise at least one bit between the MSB and LSB. Determining a value for the LSB reactive load, MSB reactive load, and a bit reactive load of the at least one bit includes determining a maximum reactive component of the first load. The MSB reactive load, LSB reactive load, and bit reactive load of the at least one bit is generally, a capacitor and may be coupled to the reactive load via any among a switch, an active switch, a MOSFET, an IGBT transistor, a pair of MOSFETs, a pair of IGBT transistors, a TRIAC, a relay, a thyristor, and a pair of thyristors. In some embodiments, the reactive power is continually monitored and a new optimum corrective reactive load to be coupled to the first load to bring the reactive power to substantially zero, and the power factor to substantially one, is dynamically determined.

In another aspect of the invention, a system for reducing distortion in an electrical signal having distortion comprises a power factor correcting module for bringing a power factor in the signal having distortion to substantially one, a subtractor for comparing a current portion of the power line to a desired reference signal, thereby forming a corrective signal, and an electric circuit for selectively sinking and sourcing current to the power line according to the corrective signal. The power factor correcting module comprises a sensor for measuring the reactive power of a first load coupled to power line and a plurality of bit reactive loads for coupling with the first load to counteract a reactive component of the first load. In some embodiments, the electric circuit for selectively sinking or sourcing current is configured to apply the corrective signal to at least one controlled current source, wherein the controlled current source couples a current supply with the power line according to the corrective signal. Alternatively, the electric circuit for selectively sinking or sourcing current comprises a modulator for modulating the corrective signal and applying the modulated corrective signal to at least one switch, wherein the switch couples a current supply with the power line and a filter for filtering modulation noise. The modulator comprises any among a pulse width modulator, delta-sigma modulator, pulse code modulator, pulse density modulator, or pulse position modulator.

In operation, an electrical circuit for reducing distortion in a current signal having distortion comprises a first input for receiving the current signal having distortion, a second input for receiving a reference signal, a subtractor coupled to the first input and second input for subtracting the current signal having distortion from the reference signal thereby forming a first corrective signal, and a circuit for selectively combining a positive portion of the first corrective signal and a negative portion of the first corrective signal with the current signal having distortion. The subtractor is able to be an analog circuit, such as an operational amplifier configured to subtract one input from another. Alternatively, the subtractor may be a digital system, such as a A/D converter capable of digitally subtracting one converted bitstream input from another, and a D/A converter for converting the result to an analog signal comprising the corrective signal.

In some embodiments, the circuit for selectively combining is able to be a positive rectifier coupled to an output of the subtractor for determining the positive portion of the corrective signal and a first controlled current source, and a negative rectifier coupled to an output of the subtractor for determining the negative portion corrective signal and a second controlled current source. Both controlled current sources are coupled to a positive power supply and a negative power supply respectively in order to selectively sink or source current to or from a main power line in order to correct distortion. In operation, when the distortion is negative, current is sourced to a power supply line according to the negative distortion to compensate. Likewise, when the distortion is positive, current is sunk away according to the positive distortion, thereby compensating.

Alternatively, the circuit for selectively combining is able to be a positive trigger comparator coupled to an output of the subtractor for determining a positive portion of the corrective signal, a negative trigger comparator coupled to the output of the subtractor for determining a negative portion of the corrective signal and a modulator. The modulator is able to be any useful type of modulator, including a pulse width modulator, a delta-sigma modulator, a pulse code modulator, a pulse density modulator, or a pulse position modulator. The modulator is able to be coupled to an output of the positive trigger comparator and an output of the negative trigger comparator for modulating any among the positive portion of the corrective signal and the negative portion of the corrective signal. In some embodiments, a first switch is coupled to positive trigger comparator. The first switch is able to selectively couple current from a negative DC power supply according to the positive portion of the corrective signal, thereby reducing distortion. Likewise, the second switch is able to selectively couple current from a positive DC power supply according to the positive portion of the corrective signal, thereby reducing distortion.

In some applications, an impedance of the power network may be far lower than the impedance of the load that the power network is delivering power to. In such circumstances, it will be appreciated by persons having the benefit of this disclosure that the direction of sourcing or sinking current may need to be reversed. By way of example, a negative distortion is regularly corrected by injecting or sourcing current into the power line. However, if the impedance of the load is greater than the impedance of the network, the current will be injected into the network rather than the load. As a result, the opposite function may be done. By sinking current from the power line, current is injected in the opposite direction.

In some embodiments, the electrical circuit for reducing distortion further comprises a power factor correction circuit for bringing the power factor between the current and the voltage being delivered to substantially unity. A system for power factor correction comprises means for determining the reactive power of a load, means for determining an optimum corrective reactive load to be coupled to the first load to bring the power factor to substantially one and the reactive power to substantially zero, and means for coupling the optimum reactive load to the first load. In some embodiments, the means for coupling the optimum reactive load to the first load comprises means for selecting a quantization level for a desired accuracy, the quantization level having an MSB and an LSB, means for determining an MSB reactive load, means for determining an LSB reactive load, and means for closing switches associated with any bit required to achieve the desired accuracy, wherein the switches electrically couple any among the MSB reactive load and LSB reactive load to the first load. The quantization level further comprises at least one bit between the MSB and LSB. More bits between the MSB and LSB will result in greater accuracy of power factor correction, or a power factor substantially closer to one. The bit reactive loads are generally a capacitor, and may be coupled to the reactive load via a switch, an active switch, MOSFET, an IGBT transistor, a pair of MOSFETs, a pair of IGBT transistors, a TRIAC, a relay, a thyristor, and a pair of thyristors.

Advantageously, such a system is able to be implemented on the scale of a family residence. The systems and circuits summarized above are able to be produced inexpensively, allowing average homeowners access to such devices. Prior art solutions generally include devices that are either targeted for industrial applications, and therefore are configured to correct power factor in networks of far greater current carrying capacity. As a result, they are very large and cost many thousands of dollars and are not amenable to residential applications. Other solutions merely correct power factor and must be applied to individual devices within a home. Furthermore, they are generally fixed capacitor power factor correction units that do not adequately correct a power factor, and may in some instances degrade power factor. Still other solutions are systems wherein a central control unit drives power factor and harmonic correction units that must be coupled to individual appliances, wherein each coupling is an installation step. Such systems also attempt to correct current waveforms by drawing and dissipating current in a purely resistive load, such as an individual appliance. Conversely, the systems and circuits and methods implemented therein are generally to be coupled between a main utility meter and the home, allowing for simple, one step installation.

DETAILED DESCRIPTION OF THE DRAWINGS

In the following description, numerous details and alternatives are set forth for the purpose of explanation. However, one of ordinary skill in the art having the benefit of this disclosure will realize that the invention can be practiced without the use of these specific details. In other instances, well-known structures and devices are shown in block diagram form in order not to obscure the description of the invention with unnecessary detail.

Power Factor Correction Methods and Apparatus

Figure 1:
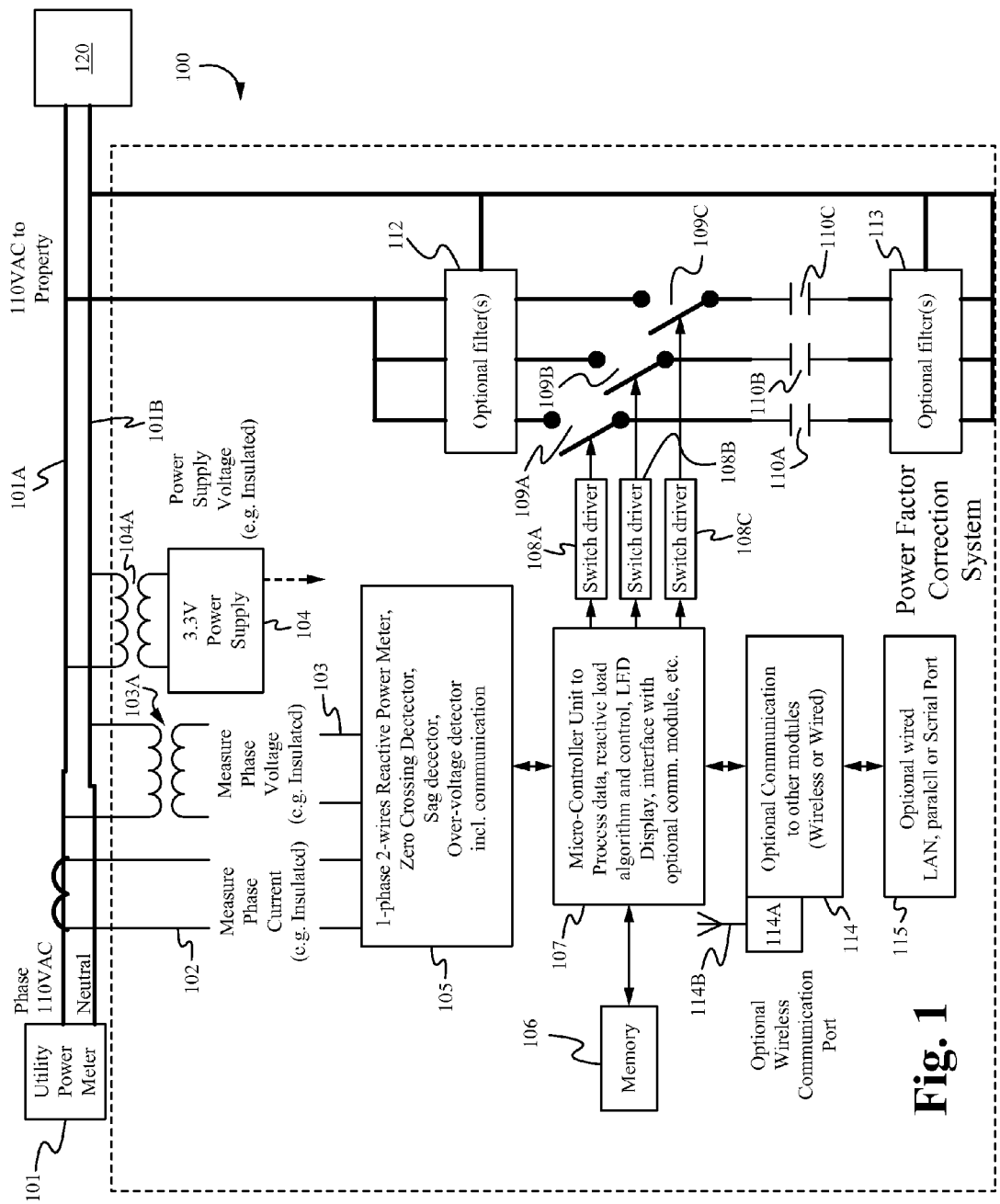
FIG. 1 is a schematic block diagram of a power factor correction circuit per an embodiment of this invention.

FIG. 1 is a block schematic diagram of a power factor correction circuit (PFC) 100 per an aspect of the present invention. Power factor (PF) is defined as the ratio of the real power flowing to the load to the apparent power, and is a number between zero and one. It may also be expressed as a percentage, i.e. a PF of 0.5 is 50%. Real power is the capacity of the circuit for performing work in a particular time. Apparent power is the product of the current and voltage of the circuit. A load with a PF substantially closer to zero draws more current than a load with a PF closer to one for the same amount of useful power transferred. It is generally understood that a PF closer to zero is considered to be a low PF and a PF closer to one is considered to be a high PF. It is highly desirable to optimize the PF and bring it close to one especially when and if the utility energy meter records only the apparent power consumed over time and not the active power. In general, utility companies prefer to have a good power factor in a grid network in order to optimize the infrastructure and maximize the active energy it can deliver to its customers. Bad power factor such as 0.9 and lower, will generate excessive apparent current loss in the lines and stress the grid due to higher currents.

In the example of FIG. 1, the PFC 100 is configured to correct the power factor of power being delivered to a residence or a home, represented by a load 120. The PFC 100 is generally coupled to a 110VAC line 101A and a neutral line 101B. The PFC 100 is coupled between a standard power meter 101 and the load 120. Most homes have several electronic appliances that all represent a load that consumes power. Usually, each load has a reactive component. This reactive component is generally the result of inductive properties of the most common loads found in a household, such as the motor of a washing machine, dryer HVAC unit, or dishwasher, and the like. The combination of all these loads appears as a single load 120 to a utility power meter 101. However, as different appliances are activated and deactivated, the reactive and real components of the load 120 seen by the power meter 101 change dynamically. To that end, the dynamic PFC 100 is able to correct a PF of a load 120 dynamically. In some embodiments, a reactive power measuring module 105 is electrically coupled to a 110VAC power line (also referred to as a phase line) 101A and a neutral line 101B by a first insulated set of conduits 102 and a second set of conduits 103. The example shown, the first set of conduits 102 are able to be wires coupled to the 110VAC power line 101A. The first set of contacts 102 measures a phase current component of the power being delivered to a load. A second set of contacts 103 is coupled across the 110VAC power line 101A and the neutral line 101B to measure the phase voltage. A step down transformer 103A may be included to lower the amplitude of the voltage allowing for more simplicity in the PFC 100, as lower voltage electronics are more cost effective and allow for greater ease of design. The reactive power measuring module 105 is able to determine the reactive power of the load through conduits 102 and 103. By way of example, the reactive power measuring module 105 is able to comprise a processor unit, such as the Analog Devices ADE 7878. The measuring module 105 is further able to communicate with an external processor 107.

In some embodiments, the controller 107 is able to selectively couple a number of reactive loads having differing values, for example capacitors 110A-110C in parallel with the load 120 in order to compensate for the reactive component of the load 120. A binary implementation is used to couple the loads 110A-110C with the load 120. In order to determine a value for the loads 110A-11C, it is advantageous to first ascertain a minimum and maximum reactive power compensation range. In a binary implementation, it can be shown that the accuracy of the PFC 100 is able to be precise as half the value of the reactive power of the lowest value among the loads 110A-110C, where each load corresponds to a bit or quantization level. The lowest value among the loads 110A-110C is a lowest bit reactive load and smallest component of the desired quantization. The exemplary implementation of the PFC 100 shows a quantization level of 3. Stated differently, there are three bit reactive loads, the lowest being the LSB, or least significant bit reactive load and the highest being the MSB, or most significant bit reactive load. The accuracy of the PFC 100 may be represented as:

$$Err_{MAX} = LSB/2$$

where the LSB is chosen optimally by the equation:

$$LSB = VAR_{MAX}/(2^N - 0.5)$$

Where $VAR_{MAX}$ is maximum reactive value of the load 120 to be compensated and N is the level of quantization. It can be appreciated that the level of quantization is directly proportional to the accuracy of the compensation of the reactive portion of the load 120. A desired quantization level may be determined as a balancing of desired accuracy versus cost and complexity. Simulations of approximately 50 samples of minimum and maximum reactive power of the load 120 to be corrected are shown in Table 1:

TABLE 1

|  | N = 1 | N-2 | N = 3 | N = 4 |
|---|---|---|---|---|
| Accuracy vs. 1LSB | 49.1% LSB | 47.9% LSB | 45.5% LSB | 46.8% LSB |
| Inaccuracy vs. $VAR_{MAX}$ | 32.7% | 13.7% | 6.1% | 3.0% |

A corrective reactive power value $Q_{CORR}$ is determined by the following algorithm:

IF $(round(Q/LSB)) > (2^N - 1)$

Then $Q_{CORR} = LSB*(2^N - 1)$

Else $Q_{CORR} = LSB*Round(Q/LSB)$, all values in VAR where Q is the reactive value of the load 120 to be compensated. As mentioned above, the reactive value of the load 120 is changing dynamically as household appliances are being activated and deactivated and their individual reactive loads are being coupled into the load 120. To that end, it is advantageous for the reactive power measuring module 105 to be configured to measure a reactive power for the load 120 and communicate the reactive power to the controller 107. Alternatively, the controller 107 may be directly coupled to the load 120 in order to determine the reactive power instantaneously. If Q is zero or positive, the reactive portion of the load 120 is inductive. Less commonly, a negative Q indicates that the reactive portion of the load 120 is capacitive. Table 2 shows an example of the impact of quantization on the PFC 100 accuracy.

TABLE 2

|  | N = 1 | N = 2 | N = 3 | N = 4 |
|---|---|---|---|---|
| Maximum correctable reactive power with max. error, MAEFS | 2000 VAR | 2000 VAR | 2000 VAR | 2000 VAR |
| Reactive power of ½ LSB | 666.7 VAR | 285.7 VAR | 133.3 VAR | 64.5 VAR |
| Reactive power of bit 1 = LSB | 1333.3 VAR | 571.4 VAR | 266.7 VAR | 129.0 VAR |
| Reactive power of bit 2 | NA | 1142.9 VAR | 533.3 VAR | 258.1 VAR |

TABLE 2-continued

|  | N = 1 | N = 2 | N = 3 | N = 4 |
|---|---|---|---|---|
| Reactive power of bit 3 | NA | NA | 1066.7 VAR | 516.1 VAR |
| Reactive power of bit 4 | NA | NA | NA | 1032.3 VAR |
| Total Active Load Power P | 10-3000 W | 10-3000 W | 10-3000 W | 10-3000 W |
| Total Reactive Load Power Q | 8-2000 VAR | 8-2000 VAR | 8-2000 VAR | 8-2000 VAR |
| MAEFS, Maximum simulated Absolute Error for QMIN to QMAX | 655 VAR | 274 VAR | 121 VAR | 60 VAR |
| Power Factor | 0.667 | 0.667 | 0.667 | 0.667 |
| Minimum simulated Power Factor after compensation | 0.782 | 0.909 | 0.96 | 0.98 |
| Average simulated Power Factor after compensation | 0.89 | 0.953 | 0.978 | 0.989 |

By way of example, the active power consumed is assumed to be between 10 and 3000 watts and the reactive power of the load 120 is assumed to be between 8 and 2000 VAR in a single phase, 2 wire network configuration. In this example, the PF is fixed at 0.67 for illustrative purposes. As can be seen from Table 2, an implementation of two or three bits (i.e. N=2 or N=3) generally optimizes a power factor to be substantially close to one while minimizing cost and complexity. For an instance in a 110V system such as in the US, and where N=3, and for the example set forth in Table 2, the reactances of the two reactive bits $Q_{LSB}$ and $Q_{MSB}$ and the middle bit Q are calculated as:

$$ZQ_{LSB}=U^2/Q_{LSB}=110V^2/266.7VAR=45.37\text{ Ohm}$$
(Purely Capacitive)

$$ZQ=U^2/Q=110V^2/533.3VAR=22.68\text{ Ohm (Purely Capacitive)}$$

$$ZQ_{MSB}=U^2/Q=110V^2/1066.7VAR=11.34\text{ Ohm}$$
(Purely Capacitive)

Referring back to FIG. 1, Capacitors 110A-110C, where 110A is the LSB bit reactive load and 110C is the MSB bit reactive load, the capacitor values are calculated as:

$$C_{LSB}=1/(2\pi FZQ_{LSB})=1/(2\pi*60\text{ Hz}*45.37\text{ Ohm})=58\text{ uF}$$

$$C=1/(2\pi FZQ)=1/(2\pi*60\text{ Hz}*22.68\text{ Ohm})=117\text{ uF}$$

$$C_{MSB}=1/(2\pi FZQ_{MSB})=1/(2\pi*60\text{ Hz}*11.34\text{ Ohm})=234\text{ uF}$$

As a result, the LSB bit reactive load 110A is 58 uF, the bit reactive load 110B is 117 uF, and the MSB bit reactive load 110C is 234 uF in this example. Each bit reactive load 110A-110C is coupled to the load 120 in parallel via switches 109A-109C. Each switch is enabled by a switch driver 108A-108C. Each switch driver in turn is controlled by the controller 107. As mentioned above, the controller 107 either is able to measure the reactive power of the load 120 to be compensated or has that information communicated to it by the reactive power measuring module 105. The controller is able to be coupled to a memory 106. Alternatively, the memory 106 may be integral to the controller 107. The memory 106 is able to store the values of the maximum reactive power of load 120 to be compensated and the bit reactive values of the loads 110A-110C. Additionally, the memory 206 is able to store power factor correction records in order to give a user, such as a homeowner, useful data on the power consumption characteristics of the residence. Therefore, the controller 107 is able to selectively activate the switch drivers 108A-108C to enable or disable switches 109A-109C thereby selectively coupling the bit reactive loads 110A-110C to the load 120 in parallel, thereby dynamically compensating for the reactive power of the load 120.

In some embodiments, the controller 107 is coupled to a communications module 114. The communications module 114 is able to communicate with other PFC units 100. Also, the communications module 114 is able to communicate with a user apparatus such as a laptop or a cell phone in order to notify a user, such as the homeowner, of the status of the PFC 100 and the amount of correction that the PFC 100 is doing. The communications module 114 is able to communicate wirelessly through a wireless module 114A. The wireless module comprises an antenna 114B to make use of a local WiFi network such as IEEE 802.11. In some embodiments, the wireless module 114A is able to communicate with a cellular telephone network via standard technologies such as CDMA or GSM. A user, such as the owner of a residence, is able to track their home's dynamic power consumption in order to make informed decisions regarding energy use. Alternatively, the communications module 114 is able to communicate via wired networks through a port 115 able to connect via LAN, Serial, Parallel, IEEE 1394 Firewire, or any other known or application specific wired communications standard. The PFC 100 further comprises a DC power supply 104 coupled to the 110VAC power line 101A and the neutral line 101B via a step down transformer 104A. The DC power supply is able to convert power from the power line 101A to a desired DC voltage to provide power to the electronics such as the reactive power measuring module 105, controller 106, and the rest of the modules within the PFC 100.

In some embodiments, the switches 109A-109C are able to be one or more transistors. A transistor may include any combination of bipolar transistors, MOS transistors, IGBT transistors, FET transistors, BJT transistors, JFET transistors, IGFET transistors, MOSFET transistors, and any other type or subset of transistor. With respect to bipolar and IGBT transistors, some considerations in the selection of bipolar or IGBT transistor are the weak zero collector—emitter voltage of the transistor in ON state and driving requirements. Furthermore, transistors are generally unidirectional, meaning that current generally flows from a drain to a source or from a collector to an emitter. To that end, it may be advantageous to arrange two transistors, one for each direction of current flow, each having its own bit reactive load to be coupled to the 120. Another implementation consideration when using transistors as switches 109A-109C is that transistors generally require an additional protection diode against reverse voltage. For example, if the transistor is rated for more than 110 or 220VAC, the maximum emitter to base voltage is approximately 5-10V. As a result, it may be advantageous to implement a protection diode in series with the emitter to protect the transistor during the reverse half sine wave voltage. Due to energy lost as heat dissipation, transistors may require one or more heat sinks. The power dissipated by the transistor in a conducting state for half the sine wave may be approximated as $$Power = U_{CE} * I_{CE}/2 = UCE * (U_{AC} - U_{CE})/(2*Z)$$

Assuming $U_{CESAT}=2$ Volts at 10 A, such as the ON Semiconductor 2N3773, $U_{AC}=110$ Volts for a common US residential power line, Z=10.59 ohm, the power dissipated as heat per transistor can be approximated as $$Power = 2V*(110VAC-2V)/(2*10.59) = 10.2 \text{ W per transistor}$$

A 2 bit reactive power correction system would require 4 transistors, 4 capacitors and 4 power diodes. The total power dissipated as heat in the switches 109A-109C may be approximated as $$Power = 2*10.2 \text{ W(bit 2)} + 2*5.1 \text{ W(bit 2=}LSB\text{)} = 30.6 \text{ W}$$

As a result, it may be advantageous to couple the switches 109A-109C to a heat sink, adding cost and complexity to the PFC 100.

MOS and MOSFET transistors are generally lower power dissipation devices. However, MOS and MOSFET devices are unidirectional as well and need protection against excess reverse $V_{GS}$ voltages. The power dissipated by a MOS or MOSFET switch in a conducting state for half the sine wave voltage may be approximated as:

$$Power = R_{DS-ON} * I_{DS}/2 = (R_{DS-ON}/2)*(U_{AC}/Z)2$$

Assuming $R_{DS-ON}=0.13$ Ohm at 10 A, such as a ST Microelectronics STF20N20, $U_{AC}=110$ Volts for a common US residential power line, and Z=10.59 ohm, the power dissipated as heat in the switch may be approximated as:

$$Power = 0.13 \text{ ohm}/2*(110VAC/10.59 \text{ ohm})2 = 7.01 \text{ W}$$

A 2 bit reactive power correction system would require 4 transistors, 4 capacitors and 4 power diodes. The total dissipated power in the switches can be approximated as $$Power = 2*7.01 \text{ W(bit 2)} + 2*3.5 \text{ W(bit 2=}LSB\text{)} = 21.0 \text{ W}$$

Although the use of MOS or MOSFET devices in the switches 109A-109C reduce the power dissipated as heat by approximately one third, a heat sink my still be needed to dissipate the waste heat. Although MOS or MOSFET devices having a very low $R_{DS-ON}$ are commercially available, they generally carry a higher cost.

Figure 2:
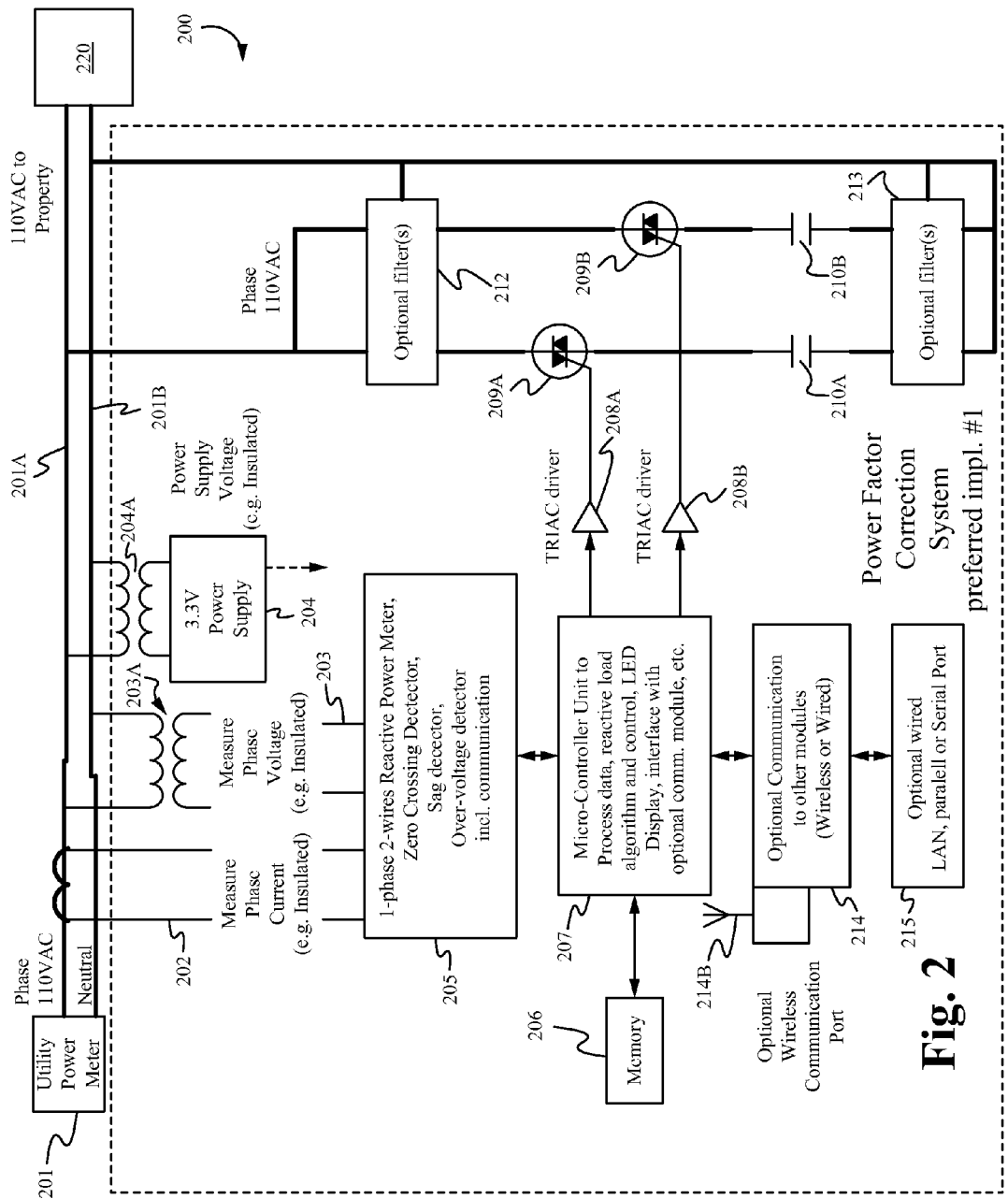
FIG. 2 is a schematic block diagram of a power factor correction circuit per an embodiment of this invention.

FIG. 2 shows a PFC 200 per an embodiment of the present invention. Similar to the PFC 100 of FIG. 1, the PFC 200 is configured to correct the power factor of power being delivered to a residence or a home, represented by a load 220. The PFC 200 is generally coupled to a 110VAC line 201A and a neutral line 201B. The PFC 200 is coupled between a standard power meter 201 and the load 220. In some embodiments, a reactive power measuring module 205 is electrically coupled to a 110 VAC power line 201A and a neutral line 201B by a first insulated set of contacts 202 and a second set of contacts 203. The example shown, the first set of contacts 202 are able to be wires coupled to the 110VAC power line 201A. The first set of contacts 202 measures a phase current component of the power being delivered to a load. A second set of contacts 203 is coupled across the 110VAC power line 201A and the neutral line 201B to measure the phase voltage. A step down transformer 103A may be included to lower the amplitude of the voltage allowing for more simplicity in the PFC 200, as lower voltage electronics are more cost effective and allow for greater ease of design. By way of example, the reactive power measuring module 105 is able to comprise a processor unit, such as the Analog Devices ADE 7753. In some embodiments, the module 205 is able to communicate sags or over voltage conditions to a micro controller 207.

A controller 207 is coupled to the reactive power measuring module 205. The controller 207 is coupled to a plurality of TRIAC drivers 208A and 208B. The triac drivers 208A and 208B in turn are configured to selectively activate and deactivate a plurality of TRIACs 209A and 209B. In the example shown, 10 mA is utilized to drive the TRIACs. However, other driving signals may be utilized to drive the TRIACs depending on its specifications. A TRIAC, or Triode for Alternating Current, is an electronic component approximately equivalent to two silicon-controlled rectifiers coupled in an inverse parallel configuration with their gates electrically coupled together. This results in an electronic switch that is able to conduct current bidirectionally and thus doesn't have any polarity. It can be activated by either a positive or a negative voltage being applied to a gate electrode. Once activated, the device continues to conduct until the current through it drops below a certain threshold value known as the holding current. As a result, the TRIAC is a very convenient switch for AC circuits, allowing the control of very large power flows with milliampere-scale control currents. TRIACs are generally understood to belong to a greater category of components known as thyristors. Thyristors include but are not limited to: silicon controlled rectifiers (SCR), gate turn off thyristors (GTO), static induction thyristors (SIT), MOS controlled thyristor (MCT), distributed Buffer-gate turn-off thyristor (DB-GTO), integrated gate commutated thyristor (IGCT), MOS composite static induction thyristor (CSMT), reverse conducting thyristor (RCT), Asymmetrical SCR (ASCR), Light Activated SCR (LASCR), Light triggered thyristor (LTT), Breakover Diode (BOD), modified anode gate turn-off thyristor (MA-GTO), distributed buffer gate turn-off thyristor (DB-GTO), Base Resistance Controlled Thyristor (BRT), field controlled thyristor (FCTh), and light activated semiconducting switch (LASS). A person of ordinary skill having the benefit of this disclosure will be able to recognize that the embodiment of the PFC 200 of FIG. 2 may be readily modified to use any known or application specific thyristor to realize particular design or application requirements to implement the PFC 200.

The controller 207 is able to implement an algorithm as described in FIG. 1 above to enable or disable the TRIACs 209A and 209B through the TRIAC drivers 208A and 208B. Advantageously, TRIACs enjoy a lower logic threshold to enable them. As a result, smaller and more cost effective components are able to be used as drivers 208A and 208B. When enabled, the TRIACs 209A and 209B couple bit reactive loads 210A and 210B in parallel with the load 220 in order to compensate for poor power factors. Optionally, filters 212 and 213 may be implemented to reduce switching noise or hum introduced by the TRIACs.

In some embodiments, the controller 207 is coupled to a communications module 214. The communications module 214 is able to communicate with either PFC units 200. Also, the communications module 214 is able to communicate with a user apparatus such as a laptop or a cell phone in order to notify a user, such as the homeowner, of the status of the PFC 200 and the amount of correction that the PFC 200 is doing. The communications module 214 is able to communicate wirelessly through a wireless module 214A having an antenna 214B to make use of a local WiFi network such as IEEE 802.11. Also, the wireless module 214A is able to communicate with a cellular network, such as CDMA or GSM so that a user may use a cellular phone in order to track and make educated decisions regarding the energy consumption of their home. Alternatively, the communications module 214 is able to communicate via wired networks through a port 215 able to connect via LAN, Serial, Parallel, IEEE 1394 Firewire, or any other known wired communications standard. A memory module 206 is coupled to the controller 207. The memory module 206 is able to store information such as the maximum expected reactive component that may be expected from the load 120, the corrective action history of the PFC 200, or any other useful data collected by or used by the PFC 200. The PFC 200 further comprises a DC power supply 204 coupled to the 110VAC power line 201A and the neutral line 201B via a step down transformer 204A. The DC power supply is able to convert power from the power line 201A to a desired DC voltage to provide power to the electronics such as the reactive power measuring module 205, controller 207, and the rest of the modules within the PFC 200.

A person of ordinary skill having the benefit of this disclosure will be able to appreciate that the PFC 100 and PFC 200 in FIGS. 1 and 2 respectively show a 2 wire, 2 phase system. The implementation of the PFC 100 or PFC 200 for three phase 3-wire or 4-wire network configuration follows the implementation of FIGS. 1 and 2 except that the bit reactive loads 110A-110C and 210A-210B, switches 109A-109C, TRIACs 209A and 209B, filters 112, 113, 212, 213 and associated driver circuits are tripled and connected from phase 1 to 2, phase 2 to 3, and phase 3 to 1. If the neutral is available, a star connection may be implemented; i.e. connection from phase 1 to neutral, phase 2 to neutral, and phase 3 to neutral. The PFC 100 and PFC 200 will be able to compensate independently for any reactive loads up the total maximum correctable value. By way of example, a property with an air conditioning unit of 300-600VAR connected between the 3 phases, a washing machine of 100-400VAR connected between phase 2 and neutral and a dryer of 100-250VAR connected between phase 3 and neutral will all be fully corrected up to the maximum correctable reactive value.

Distortion Correction Methods and Apparatus

A power factor that is less than perfect is the most common weakness to be corrected in an electrical network. Another and more common weakness and source of problem is distortion in a power line due to non linear loads and the growing proliferation of electronics devices with affordable but less than perfect power adapters. Generally, when no special effort is provided in the design the power adapter, the AC power signal is generally first fully rectified on both sine periods and then roughly filtered by a big capacitor, followed by isolated DC-DC power supply electronics, such as integrated circuits. This affordable and non-energy star solution generates current harmonics that are fed back onto the network. The result is a current waveform is that is close to a truncated parabolic shape rather than a sine wave. Distortion is able to comprise harmonic distortion resulting from the various characteristics of the loads that absorb and reflect power, noise, or any other form of distortion.

Figure 3A:
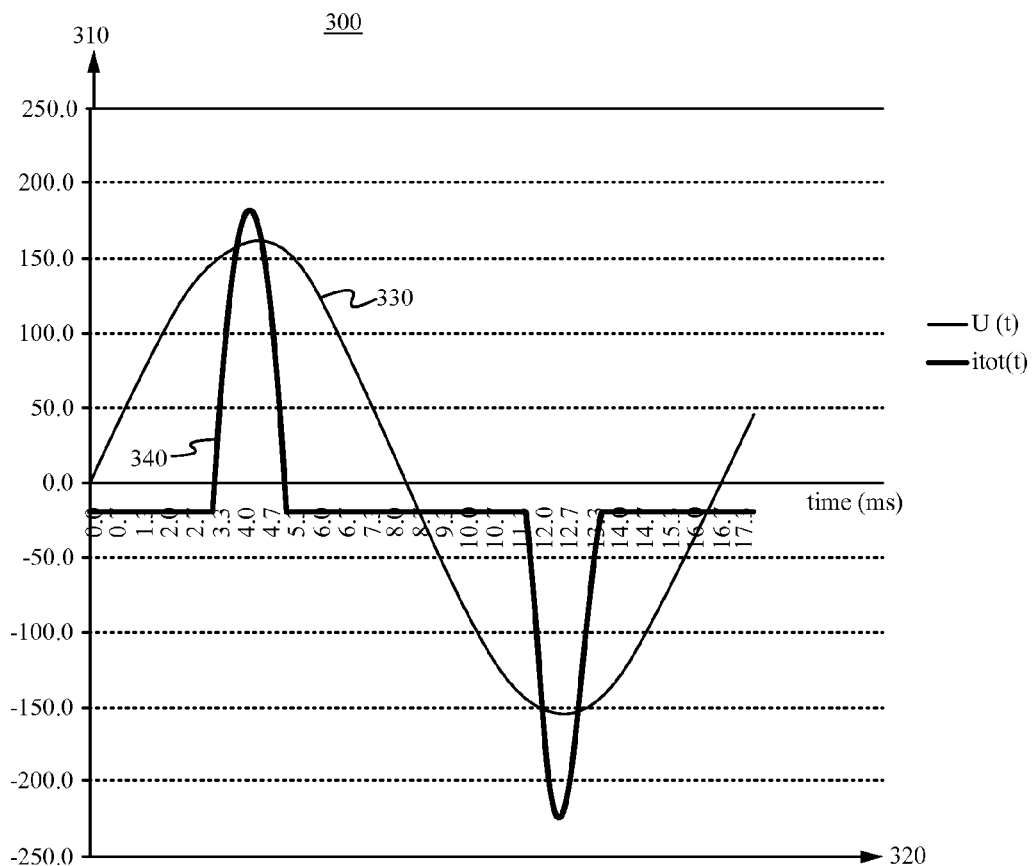
FIG. 3A is a time vs. amplitude graph of a power factor corrected power signal having distortion.
Figure 3B:
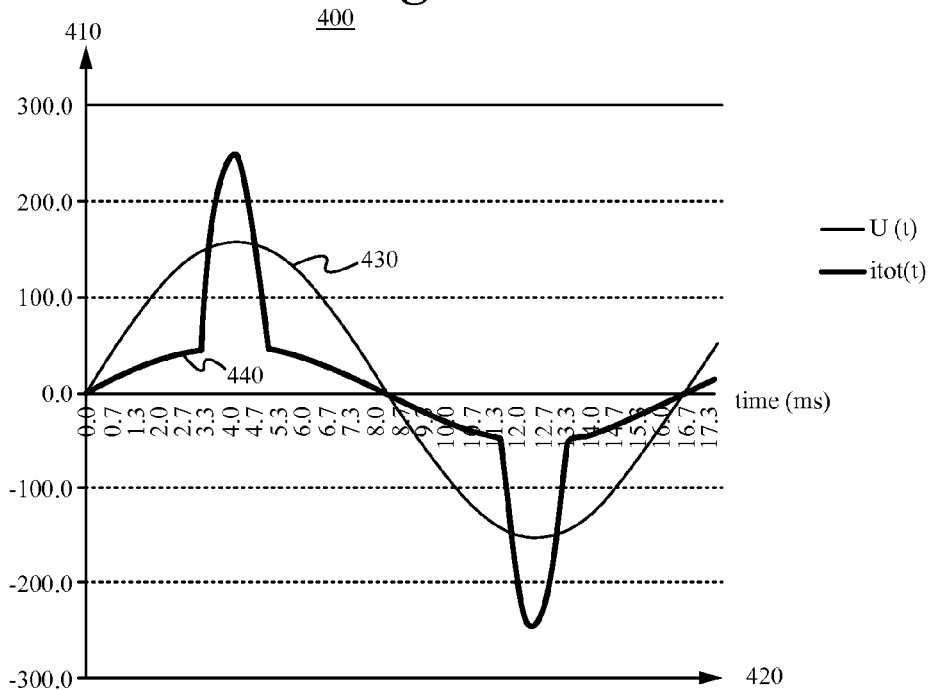
FIG. 3B is a time vs. amplitude graph of a power factor corrected power signal having distortion.
Figure 3C:
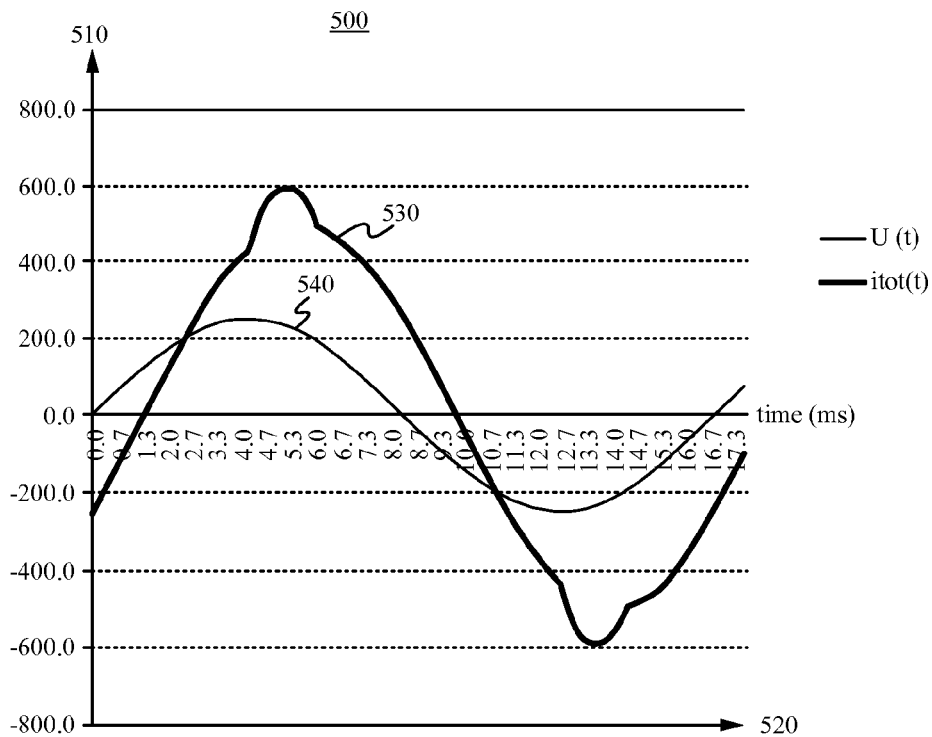
FIG. 3C is a time vs. amplitude graph of a power factor corrected power signal having distortion.
Figure 3D:
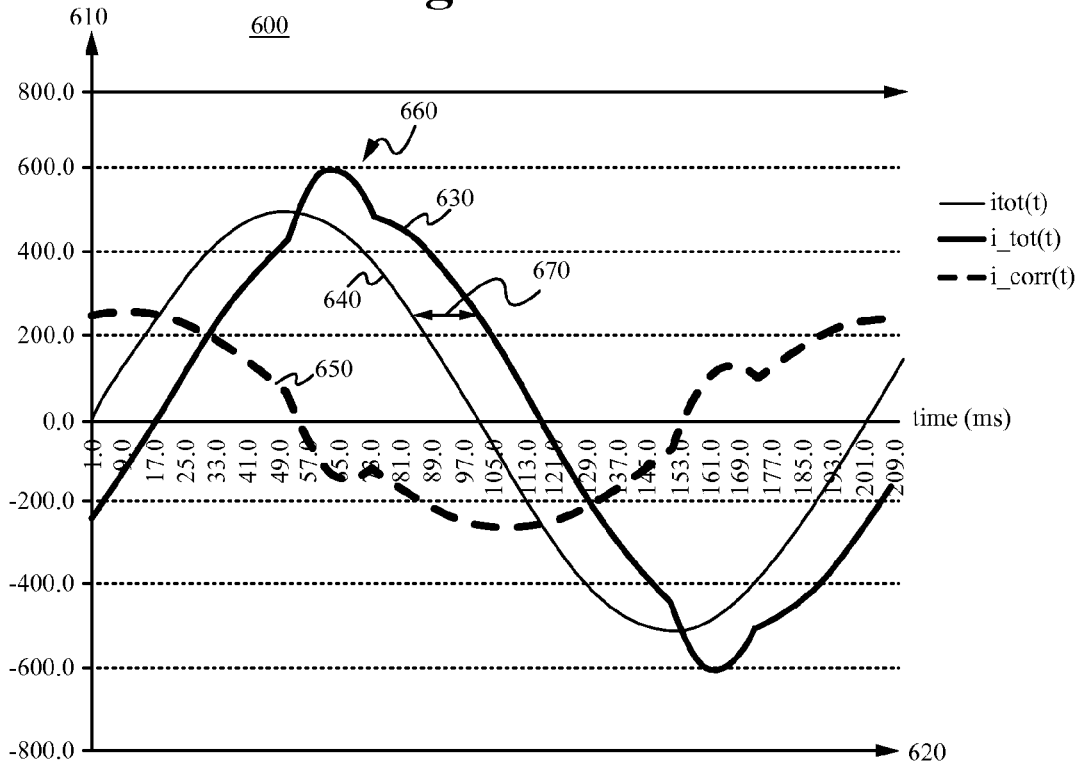
FIG. 3D is a time vs. amplitude graph of a power signal having a poor power factor, distortion and methods of correction of distortion.

FIG. 3A shows a time versus amplitude graph 300 of a power factor corrected power signal having distortion. The first axis 320 represents time in milliseconds and the second axis 310 is a generic amplitude scale to show the amplitudes of both the current and the voltage. The voltage U(t) 330 appears as a perfect 60 Hz sine wave. However, the current $i_{TOT}(t)$ is heavily distorted to the point where it no longer resembles a corresponding sine wave. FIG. 3B shows a similar graph 400 having a time axis 420 and an amplitude axis 410. A voltage waveform 430 closely tracks a perfect sine wave. However, the current waveform 440 is heavily distorted. In a residence, heavy use of ubiquitous and low quality power adaptors along with standard resistive loads may cause a current waveform 440 to display such distortion: some resemblance to a sine wave but still greatly distorted. FIG. 3C shows a similar graph 500 having a time axis 520 and an amplitude axis 510. Here, the current waveform 530 is even more greatly distorted versus the voltage waveform 540 due to the introduction of one or more heavy reactive loads such as air conditioning and dryer units. Finally, FIG. 3D is a graph 600 of a common current waveform 630 versus a voltage waveform 640. Not only are heavy reactive loads, resistive loads, and AC-DC power adaptors causing significant distortion in the current 630, there is also a phase shift 670 between the current 630 and voltage 640. In this example, the distortion is shown as a peak 660 in the distorted current signal 630. In this example, the phase shift is approximately 30 degrees, corresponding to a PF of 0.67. In order to correct the distortion, it is advantageous that the PF first be corrected. PF correction may be achieved by the methods or apparatus discussed above in FIG. 1 and FIG. 2 or any other convenient method. A corrective signal 650 is derived by comparing the distorted current waveform 630 to the near perfect sine wave approximation voltage waveform (not shown). The corrective signal 650 comprises a factor of the distortion within the current waveform 630. The factor may be one, but the factor may be any necessary multiplicand to achieve a desired amplitude ratio of the current waveform. By way of example, the multiplicand may be a factor to convert a voltage to a current or a current to a voltage. When the corrective signal 650 is selectively coupled to the current signal 630, the result is a corrected current signal 640 having greatly reduced or eliminated distortion.

Figure 4:
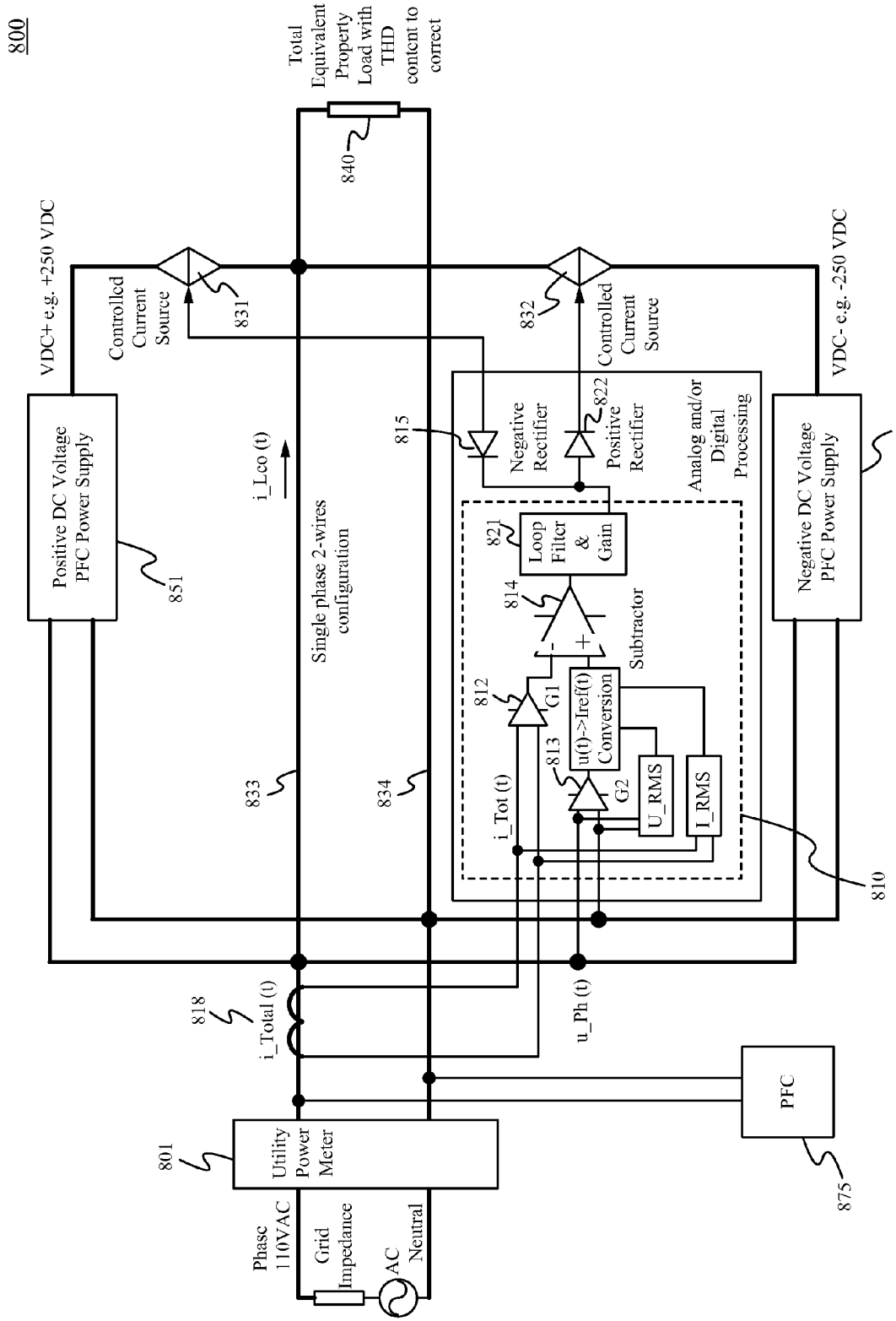
FIG. 4 is a schematic block diagram of a distortion reducing circuit per an embodiment of this invention.

FIG. 4 shows a schematic block diagram of a circuit 800 for suppressing or eliminating distortion as described in FIG. 3D. The circuit 800 is coupled between a utility power meter 801 and a load 840. The load 840 may be any load, but in this application and example it is a residential dwelling. The load 840 comprises all electrical devices within the dwelling that together appear as one load 840 to a utility power meter 801. The characteristics of the load 840 change dynamically as appliances are activated and deactivated within the residence thereby coupling and decoupling their individual loads to the load 840. A PFC 875 is able to correct a power factor in a power line 833 to substantially one. A processor 810 is able to detect a current by sensing the power line 833. In this exemplary embodiment, the processor 810 is an analog device. However, a person of ordinary skill having the benefit of this disclosure will recognize that digital processing may be substituted. The processor 810 is also able to detect a voltage by sensing both the power line 833 and a neutral line 834. The power line 833 is also referred to as a phase line. In this exemplary implementation, the processor 810 comprises two differential inputs. Each input is coupled to a multiplier G1 812 and G2 813. The multipliers 812 and 813 are able to scale the current or the voltage by any factor desired or required by a particular application or implementation of the circuit 800. G1 is configured to receive the current from the power line 833. In this embodiment, the multiplier G2 is able to convert the voltage sensed into a current signal. Both the voltage and the current are scaled by their respective RMS values. The multipliers 812 and 813 are able to be standard analog operational amplifiers or any other useful circuit. The outputs of the multipliers 812 and 813 are coupled to a subtractor 814. In some embodiments, the subtractor 814 is configured to compare the scaled outputs of G1 812 and G2 813, thereby deriving a corrective signal, such as the signal 650 of FIG. 3D.

Advantageously, converting both inputs to a current allow for the use of a simple subtractor 814. However, both inputs may be converted into a voltage signal as well. In some embodiments, it may be desirable to include a block loop gain and loop filter 821 to control the process and optimize system control such as dynamic behavior, stability, gain margin, phase margin, and the like. It should be noted that the subtractor 814 is able to be configured to compare the total current to a reference signal by subtracting the total current having distortion from the reference signal, or subtract the reference signal from the total current having distortion. The configuration may be made to suit particular implementation or application requirements. As a result, the corrective signal may be directly or inversely proportional to the distortion in the total current.

The corrective signal is combined with the current to form a corrected current signal having greatly reduced or eliminated distortion, such as the signal 640 in FIG. 3D. In the embodiment shown in FIG. 4, the output of the loop filter 821 is coupled to a negative rectifier 815 and a positive rectifier 822. The negative rectifier 815 is in turn coupled to a first controlled current source 831 and the negative rectifier is coupled to a second controlled current source 832. In certain applications, such as the example of FIG. 4, the impedance of the network downstream from the power meter 801 may have a very small impedance compared to the load 840. As a result, when current is injected to correct a negative distortion, the current will be sourced towards the grid rather than the load 840. As a result, distortion will be amplified. To that end, the embodiment of FIG. 4 sinks current from the power line 833 in response to a negative distortion and sources current in response to a positive distortion. Due to the imbalance of the impedances of the grid and the load 840, the selectively sourced and sunk current will correct the distortion. When a corrective signal is negative, meaning that the distortion component is subtractive to the total current, the positive rectifier 822 enables the second controlled current source 832. The second controlled current source 822 is coupled to a negative DC power supply 852. When the second controlled current source 832 is enabled, current is sunk from the power line 833. In an embodiment wherein the grid impedance is lower than the impedance of the load 840, current will be sunk from the grid rather than the load, causing an additive effect to the load 840. When a corrective signal is positive, meaning the distortion is additive to the total current, the negative rectifier 815 enables the first controlled current source 831. The first controlled current source 831 is coupled to a positive DC power supply 851. When the first controlled current source 831 is enabled, current is sourced from the positive DC power supply 851 to the power line 833. Again, in applications where the grid impedance is lower than the load 840, current will be sourced into grid rather than the load, causing a subtractive effect on the load 840. In operation, a corrective signal such as the signal 650 in is combined with a current signal having distortion such as the waveform 630 of FIG. 3C by selectively sinking or sourcing current according to the corrective signal into the power line. One of a positive portion of the corrective signal and a negative portion of the corrective signal is selectively coupled to one of the controlled current sources 831 and 832. This is able to be done dynamically as the distortion component of the power line 833 changes with changes in the load 840 since the processor 810 continually compares the voltage to the current and continually derives a corrective signal. Alternatively, the processor 810 is able to generate its own reference signal to compare the distorted current signal to. For example, power in the United States is delivered at 60 Hz. Therefore, a 60 Hz function generator within the processor 810 would be able to generate a perfect sine wave to compare the distorted current signal to and thereby derive a corrective signal. Alternatively, phase locked loops may be implemented to lock on zero crossing times of the voltage in order to derive a near perfect reference signal. As mentioned above, the subtractor 814 may be configured to form a corrective signal that is directly or inversely proportional to the distortion in the total current. If the subtractor 814 is configured to form a corrective signal that is directly proportional to the distortion, then a positive portion of the distortion should cause current to be sunk from the power line 833 accordingly. Likewise, a negative portion of the distortion should cause current to be sourced into the power line accordingly. The inverse is also true. In embodiments wherein the corrective signal is inversely proportional to the distortion in the total current, a negative portion of the corrective signal should cause current to be sunk away from the power line 833. Likewise, a positive portion of the corrective signal should cause current to be sourced into the power line 833.

While the embodiment shown in FIG. 4 utilizes components that are widely available and cost effective, it can be appreciated that the controlled current sources 831 and 832 are not very energy efficient. Assuming the positive DC power supply 851 is 250V, the instantaneous voltage in the power line 833 is 150V, and that the corrective current signal is 10 A, the power dissipated and lost to waste heat may be hundreds of watts.

Figure 5:
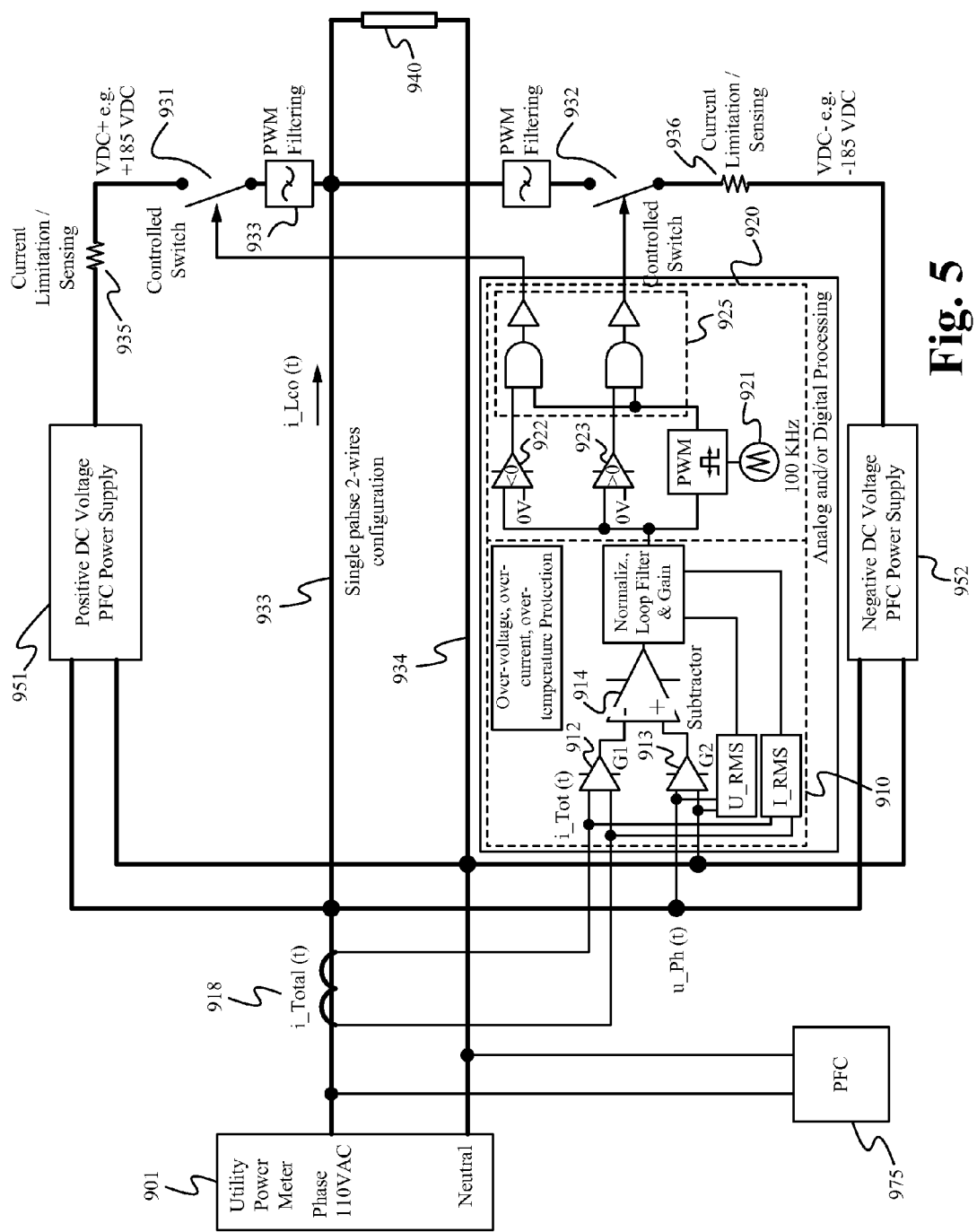
FIG. 5 is a schematic block diagram of a distortion reducing circuit having modulation per an embodiment of this invention.

To that end, FIG. 5 shows a distortion reduction circuit 900 having a modulator 920. Similar to the circuit 800 of FIG. 4, The circuit 900 is coupled between a utility power meter 901 and a load 940. The load 940 may be any load, but in this application and example it is a residential dwelling. The load 940 comprises all electrical devices within the dwelling that together appear as one load 940 to a utility power meter 901. A PFC 975 is able to bring a power factor of the power line 933 to substantially one. The PFC 975 may be according FIG. 1 or 2 or any other convenient PFC. As mentioned above, the characteristics of the load 940 change dynamically. A processor 910 is able to detect a current by sensing a power line 933. In this exemplary embodiment, the processor 910 is an analog device. However, a person of ordinary skill having the benefit of this disclosure will recognize that there are many off the shelf digital processors capable of executing the functions described below. The processor 910 is also able to detect a voltage by sensing both the power line 833 and a neutral line 934. In this exemplary implementation, the processor 910 comprises two differential inputs. Each input is coupled to a multiplier G1 912 and G2 913. G2 913 is able to convert a voltage to a current signal in a similar fashion to G2 813 of FIG. 4 and is shown in a simplified manner. The multipliers 912 and 913 are able to be standard analog operational amplifiers or any other useful circuit. The outputs of the multipliers 912 and 913 are coupled to a subtractor 914. In some embodiments, the subtractor 914 is configured to subtract the output of G1 912 from the output of G2 913, thereby deriving a corrective signal, such as the signal 650 of FIG. 3D. In some embodiments, it may be desirable to multiply this corrective signal by a scaling factor. By way of example, a loop gain filter is included to control the process in a similar fashion as shown in FIG. 4 and in some embodiments combines the corrective signal by an RMS value of the current 811.

The output of the loop filter is coupled to a modulator 920. In this exemplary embodiment, the modulator 920 is a pulse width modulator (PWM). However, any method or scheme of modulation may be implemented as specific implementation and design restrictions require, including but not limited to PWM, delta-sigma modulation, pulse code modulation, pulse density modulation, pulse position modulation, or any other known or application specific modulation scheme. The modulator 920 comprises a positive trigger comparator 822 and a negative trigger comparator 823 that signal a high logic level when the corrective signal emitted from the multiplier 915 is positive and a low logic level when the corrective signal is negative. In some embodiments, the low logic level is able to be a negative value. A pulse generator 921 generates a triangle wave that is combined with the positive portion of the corrective signal emitted from the negative trigger comparator 922 and the negative portion of the corrective signal emitted from the positive trigger comparator 923 by combinational logic 925. As a result, what is formed is a PWM corrective signal divided between positive and negative portions. The combinational logic 925 is configured to selectively couple a positive portion of the PWM corrective signal with a first controlled switch 932. The first controlled switch 932 is coupled to a negative DC power supply 952. The combinational logic 925 is also configured to selectively couple a negative portion of the PWM corrective signal with a second controlled switch 931. The second controlled switch is coupled to a positive DC power supply 952.

In operation, the switches 931 and 932 are selectively controlled by the PWM corrective signal depending on whether the PWM corrective signal is positive or negative. In some embodiments, a positive PWM corrective signal means that the distortion to be corrected in the power line 933 is negative, and vice versa. To correct a negative distortion in the power line 933, the second controlled switch 831 is enabled according to a negative portion of the PWM corrective signal. The second controlled switch, when enabled, couples sources from the positive DC power source 951 with the power line 933 according to the PWM corrective signal.

In the embodiment of FIG. 5, an embodiment is shown wherein the impedance of the utility power meter 901 (and the grid that is downstream) has a lower impedance than the load 940. As a result, if a positive distortion is attempted to be corrected by a negative PWM corrective signal, the current sunk from the power line 933 will be sunk from the grid rather than the load 940. As a result, the distortion will be amplified. To that end, a positive PWM corrective signal is used to correct a positive distortion and a negative PWM corrective signal is used to correct a negative distortion in applications where the impedance of the load 940 is greater than the impedance of the grid downstream from the power meter 901.

In some embodiments, it may be advantageous to filter the modulating signal. To that end, a filter 933 is included. Similarly, to correct a positive distortion in the power line 933, the first controlled switch 832 is enabled according to a negative portion of the PWM corrective signal. The first controlled switch, when enabled, sinks current to the negative DC power source 952 from the power line 933 according to the PWM corrective signal. As a result, distortion is substantially decreased from the current in the power line 933. Also, a second filter 934 may be advantageous to filter PWM noise from the power line 933. Each of the positive DC power source 951 and negative DC power source 952 comprise current limiting and sensing module 935 and 936 for communication any over current or under current conditions to the processor 910.

Figure 6:
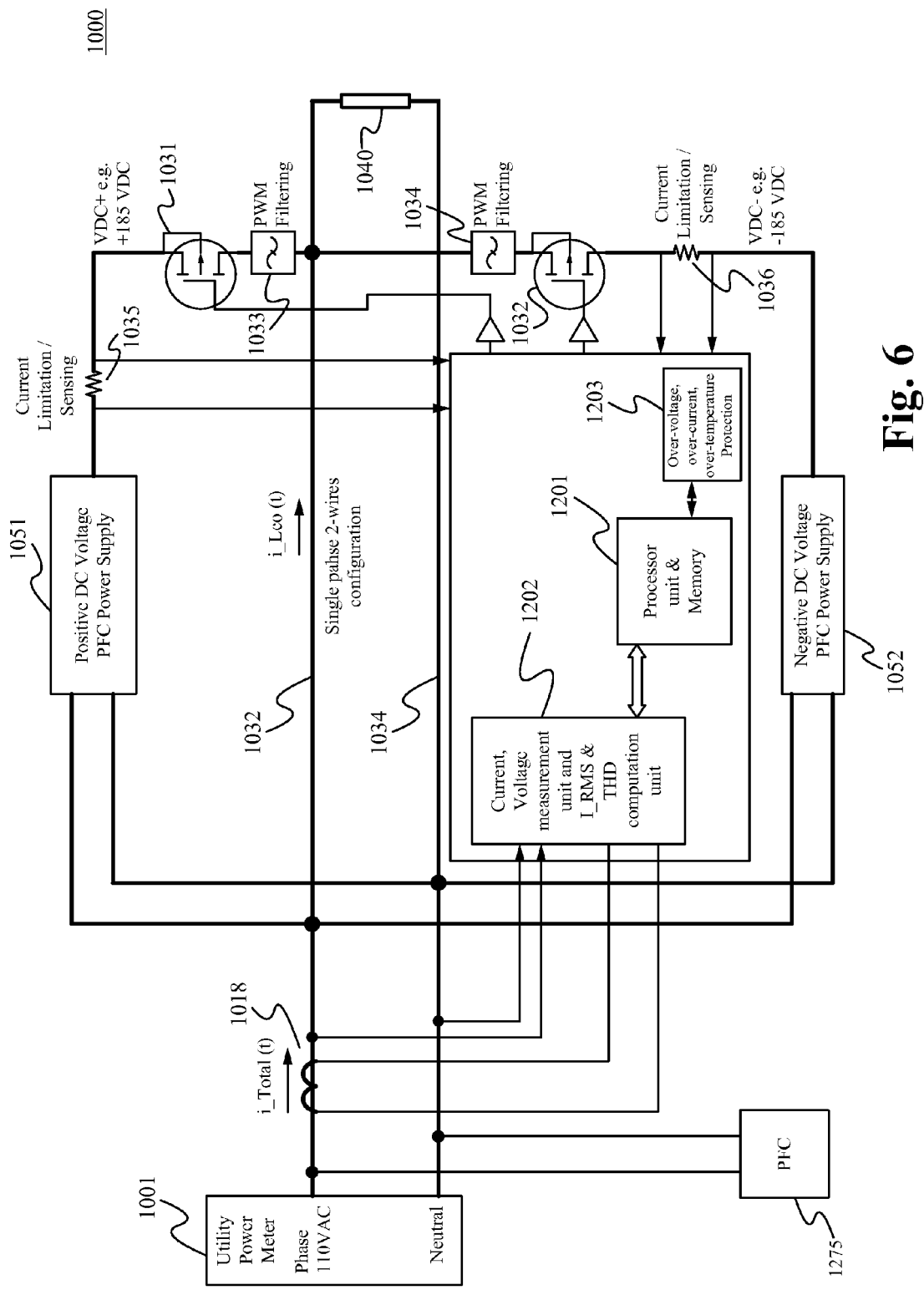
FIG. 6 is a schematic block diagram of a distortion reducing circuit having modulation per an embodiment of this invention.

FIG. 6 shows another embodiment of a distortion correction circuit 1000. Again, the circuit 1000 is coupled to a power line 1032 and a neutral 1034 in a two wire, one phase power system between a utility power meter 1001 and a load 1040. The load 1040 comprises all appliances and other electronic devices within a residence that appear as one load 1040 having reactive properties. In this embodiment, the current is measured by a processor unit 1200. A PFC 1275 is able to correct a power factor in the power line 1032 as described above. The processor unit 1200 comprises a current and voltage measurement module 1202. The module 1201 is also configured to do RMS and distortion computation. The module 1202 is able to be a digital processing module. In some embodiments, the module 1202 comprises one or more analog to digital converters for converting data, such as amplitude, phase, and distortion into digital bitstreams upon which mathematical operations may be done digitally. The processor 1200 is also able to have a memory module 1201. The memory module 1201 is able to store information relating to the dynamic harmonic correction, such as during what times of day correction is most active. The memory 1201 may be removed and inserted into a device such as a computer so that a user may make informed decisions regarding energy use. Alternatively, the processor 1200 comprises a communications module (not shown). The communications module may be connected to the internet through wires, such as by LAN cable, or wirelessly via a convenient standard such as IEEE 802.11 or BlueTooth. Furthermore, the communications module may communicate through cellular standards such as GSM or CDMA. A protection module 1203 integral to the processor 1200 is able to power down the circuit 1000 in any defined fault condition, such as over voltage, over current, and over temperature. Such fault conditions are able to be stored in the memory 1201.

The processor 1200 is able to compute the total current having distortion within the power line 1032 and generate a reference signal. A digital to analog converter is able to convert digital bitstreams representing a total current and a reference signal into analog waveforms. Similar to the embodiments of FIGS. 4 and 5, the total current signal may be subtracted from the reference signal by a subtractor. Alternatively, the processor 1200 is able to digitally subtract the total current from the reference signal, thereby forming a digital corrective signal. The processor 1200 is also able to modulate the digital corrective signal by any convenient known or application specific means of modulation. The modulated corrective signal may then be selectively coupled with a first transistor 1031 or a second transistor 1030 depending on whether current must be sunk or sourced into the line 1032 to correct distortion in the total current. The first and second transistors 1031 and 1030 operate as switches, that when enabled by the modulated corrective signal, source or sink current to or from the line 1032 from a positive DC source 1051 or a negative DC source 1052. In some embodiments, it may be advantageous to include a first filter 1033 and a second filter 1034 to filter PWM noise from the first transistor 1031 and the second transistor 1030 respectively.

Figure 7:
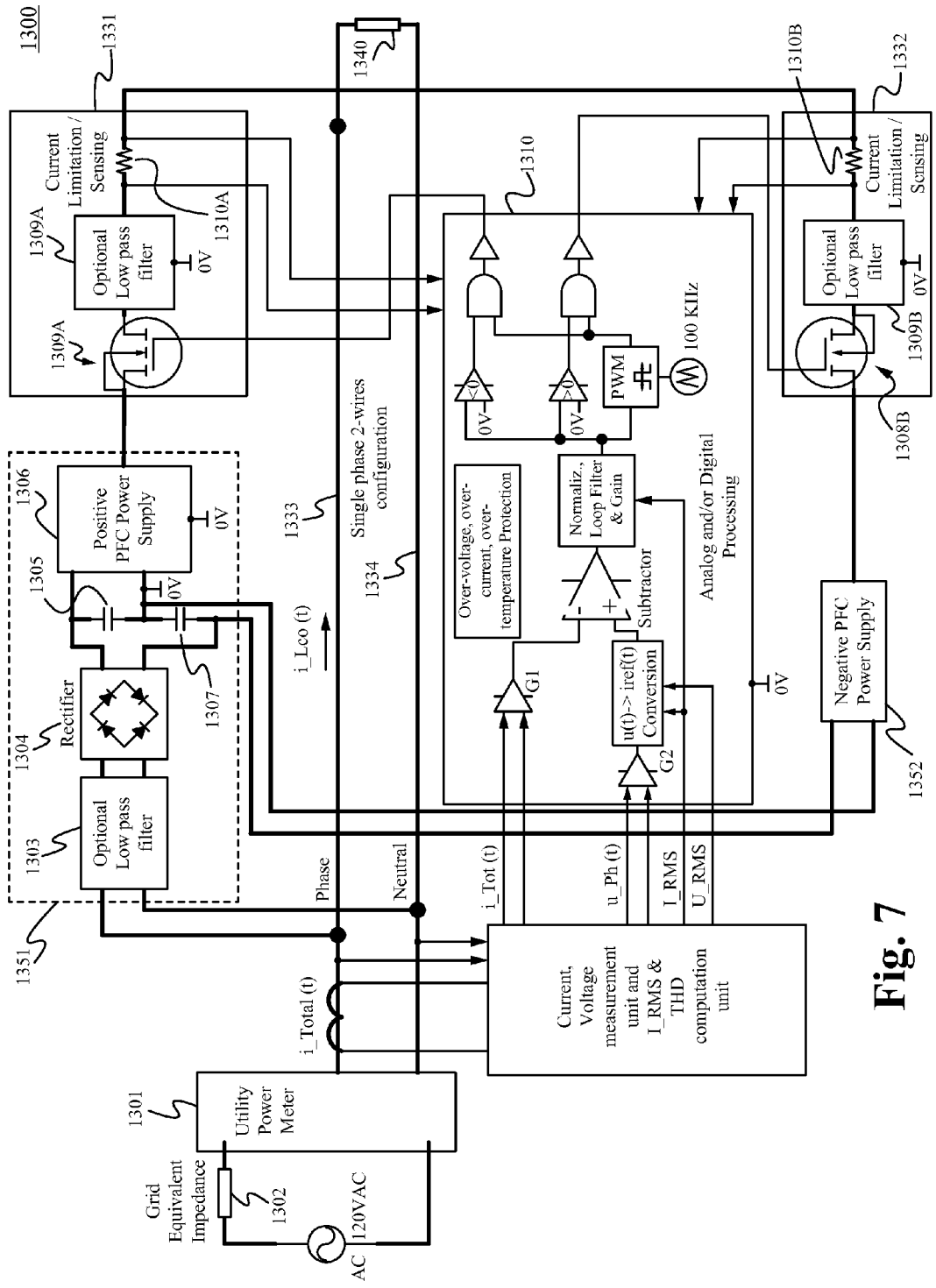
FIG. 7 is a schematic block diagram of a distortion reducing circuit having modulation and enhanced filtering per an embodiment of this invention.

FIG. 7 shows a further detailed embodiment of the invention of FIGS. 4, 5 and 6. The power factor and distortion correction module 1300 is coupled between a utility power meter 1302 and an equivalent property load 1340. The load 1340 is a representation of a dynamic load that changes as appliances within the residence as activated and deactivated. The positive DC power source 1351 comprises an optional low pass filter 1303 for filtering any noise and harmonics that may be present across the phase line 1333 and neutral 1334. AC power from the grid 1301 is rectified by a bridge rectifier 1304 and passed through a reservoir capacitor 1305. A PFC module 1306 is provided for correcting a less than ideal power factor. The PFC module 1306 is able to utilize any of the methods or apparatus described in FIGS. 1 and 2 and accompanying description. A first switching circuit 1331 comprises a first transistor 1308A coupled to the processing unit 1310. The processing unit 1310 drives the transistor 1308A by utilizing a modulated signal. The transistor 1308A couples current from the positive DC power source 1351 to the phase line 1333 in response to a corrective signal as described in the previous embodiments in FIGS. 5 and 6. An optional low pass filter 1309A is provided for filtering a modulating signal. A current limitation and sensor 1310A is able to communicate overcurrent conditions to the processor 1310. The sensor 1310A is represented by a resistor, but may be any useful sensing module for sensing an overcurrent condition. The positive DC power source is further coupled to a negative PFC module 1352 through an inverting power supply capacitor 1307. The inverting reservoir capacitor 1307 provides negative DC power proportional to the power supplied by the DC power source 1351. The negative PFC module 1352 is able to correct a power factor on the phase line 1333 according to the methods and apparatus described in FIGS. 1 and 2. The negative PFC module 1352 is coupled to a second switching circuit 1332. The second switching circuit 1332 comprises a second switching transistor 1308B also for receiving a modulated corrective signal from the processing unit 1310 as described in the embodiment of FIGS. 5 and 6. The processing unit 1310 comprises scaling multipliers G1 and G2. In this embodiment, G2 is coupled to a voltage to current converter. A subtractor is able to compare one voltage signal to another to derive a corrective signal, as described in previous embodiments. A modulator is coupled to the output of the subtractor for modulating the corrective signal. In this embodiment, PWM is shown. However, any known or application specific modulation scheme may be utilized. In some embodiments, a loop filter is coupled between the subtractor and modulator for controlling the process and optimize system control such as dynamic behavior, stability, gain margin, phase margin, and the like. Furthermore, external processing may contribute to current measurement, voltage measurement, RMS and distortion computations and include memory such as RAM or ROM.

Figure 8:
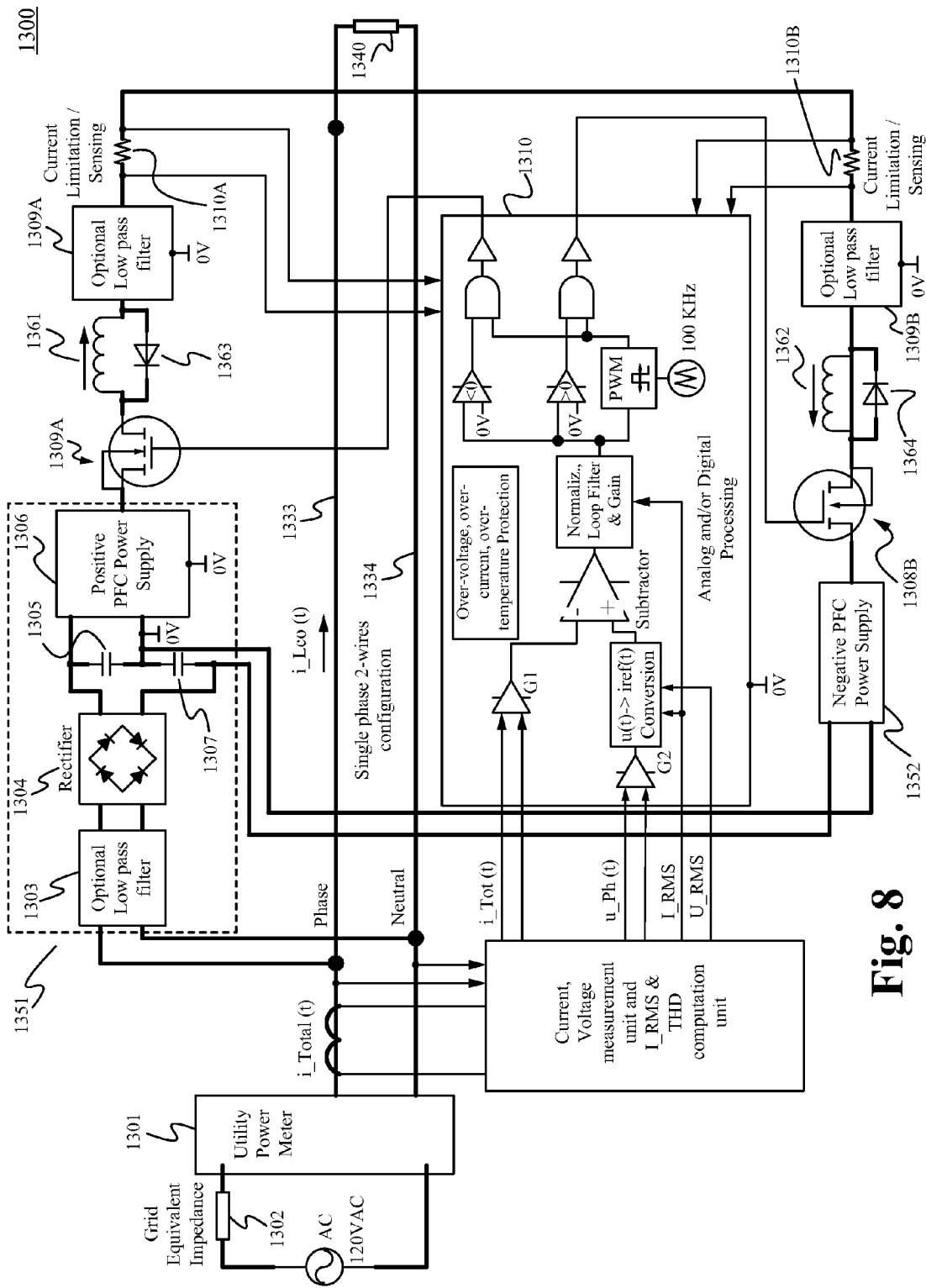
FIG. 8 is a schematic block diagram of a distortion reducing circuit having modulation and enhanced filtering per an embodiment of this invention.

FIG. 8 shows another embodiment wherein the source and sink current paths include an inductance 1360 and 1361 each to smooth and filter out the modulation that may generate spikes of voltages and currents. The first and second switching transistors 1308A and 1308B may charge the inductors 1360 and 1361 respectively in a quasi linear ramp up and when either the transistors 1308A and 1308B are disabled, and let the current charge decrease to zero in a quasi linear fashion. A free wheel diode 1363 is needed to avoid for the current to shut off rapidly to avoid destructive high voltage spikes due to the inductance. A second freewheel diode 1364 is coupled in parallel to the second inductor 1362. The current waveform formed is similar to seesaw shape and allows for simpler filters 1309A and 1309B. In some embodiments, the inductors 1361 and 1362 are integrated into the filters 1309A and 1309B. Advantageously, losses in the paths sinking and sourcing current are diminished. In some embodiments, capacitors may be included in parallel to recycle any lost energy by the free wheel diodes 1363 and 1364. In the embodiment of FIG. 8, the inductors 1361 and 1362 are coupled between the switching transistors 1308A and 1308B and the low pass filters 1309A and 1309B respectively. In some applications, it may be advantageous to couple the inductors 1361 and 1362 between the PFC modules 1351 and 1352 and the transistors 1308A and 1308B so that the inductance are not directly coupled with the load 1340, and the impedance measured from the grid 1301 is improved.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications are able to be made in the embodiment chosen for illustration without departing from the spirit and scope of the invention as defined by the claims.

What is claimed is:

1. A system for reducing distortion in an electrical signal having distortion comprising:
   a. an electric circuit for comparing at least a portion of the electrical signal having distortion in a power line to a desired reference signal, thereby forming a corrective signal; and
   b. an electric circuit including a plurality of selectable loads for selectively sinking and sourcing current to the electrical signal having distortion.

2. The system of claim 1 wherein distortion comprises any among harmonic distortion, noise, elevated spectral noise, and amplitude modulation.

3. The system of claim 1 further comprising a power factor correction module for bringing a power factor of the electrical signal having noise to substantially one.

4. The system of claim 3 wherein the power factor correcting module comprises:
   a. a sensor for measuring the reactive power of a first load coupled to power line; and
   b. a plurality of bit reactive loads for coupling with the first load to counteract a reactive component of the first load.

5. The system of claim 1 wherein the electric circuit for selectively sinking and sourcing current applies the corrective signal to at least one controlled current source, wherein the controlled current source couples a current supply with the power line according to the corrective signal.

6. The system of claim 1 wherein the electric circuit for selectively sinking and sourcing current comprises:
   a. a modulator for modulating the corrective signal and applying the modulated corrective signal to at least one switch, wherein the switch couples a current supply with the power line; and
   b. a filter for filtering a modulating signal.

7. The system of claim 6 wherein the modulator comprises any among a pulse width modulator, delta-sigma modulator, pulse code modulator, pulse density modulator, or pulse position modulator.

8. The system of claim 1 wherein the electric circuit for selectively sinking and sourcing current comprises:
   a. a processor for selectively sourcing current into the power line in response to a negative distortion; and
   b. a processor for selectively sinking current from the power line in response to a positive distortion.

9. The system of claim 1 wherein the electric circuit for selectively sinking and sourcing current comprises:
   a. a processor for selectively sourcing current into the power line in response to a positive distortion; and
   b. a processor for selectively sinking current from the power line in response to a negative distortion.

10. The system of claim 1, further comprising a signal generator, wherein the reference signal is generated by the signal generator.

11. An electrical circuit for reducing distortion in a current signal having distortion in a power line, the electrical circuit comprising:
   a. a first input for receiving the current signal having distortion;
   b. a second input for receiving a reference signal;

c. a subtractor coupled to the first input and second input for subtracting the current signal having distortion from the reference signal thereby forming a corrective signal; and d. a circuit for selectively sinking and sourcing current from and to the current signal having distortion according to the corrective signal, the circuit comprising a plurality of selectable loads; thereby reducing distortion in the current signal having distortion.

12. The electrical circuit in claim 11 wherein the distortion comprises any among harmonic distortion, noise, elevated spectral noise, and amplitude modulation.

13. The electrical circuit in claim 11 further comprising a power factor correction module for bringing a power factor of the signal having distortion to substantially one.

14. The electrical circuit in claim 13 wherein the power factor correction module comprises a sensor for measuring the reactive power of a first load coupled to power line and a plurality of bit reactive loads for coupling with the first load to counteract a reactive component of the first load.

15. The electrical circuit in claim 11 wherein the circuit for selectively sinking and sourcing current comprises:
   a. a first controlled current source coupled to the corrective signal, wherein the first controlled current source sources current to the current signal having distortion from a positive power according to the corrective signal in response to a negative distortion; and
   b. a second controlled current source coupled to the corrective signal, wherein the second controlled current source sinks current from the current signal having distortion to a negative power according to the corrective signal in response to a positive distortion.

16. The electrical circuit in claim 11 wherein the circuit for selectively sinking and sourcing current comprises:
   a. a first controlled current source coupled to the corrective signal, wherein the first controlled current source sources current to the current signal having distortion from a positive power according to the corrective signal in response to a positive distortion; and
   b. a second controlled current source coupled to the corrective signal, wherein the second controlled current source sinks current from the current signal having distortion to a negative power according to the corrective signal in response to a negative distortion.

17. The electrical circuit in claim 11 wherein the circuit for selectively sinking and sourcing current comprises:
   a. a positive rectifier coupled to an output of the subtractor for determining the positive portion of the corrective signal;
   b. a first controlled current source coupled to a positive DC power supply configured to selectively combine the positive portion of the corrective signal with the current signal having distortion in response to a negative distortion;
   c. a negative rectifier coupled to an output of the subtractor for determining the negative portion corrective signal; and
   d. a second controlled current source coupled to a negative DC power supply configured to selectively combine the negative portion of the corrective signal with the current signal having distortion in response to a positive distortion.

18. The electrical circuit in claim 11 wherein the circuit for selectively sinking and sourcing current comprises:
   a. a positive rectifier coupled to an output of the subtractor for determining the positive portion of the corrective signal;
   b. a first controlled current source coupled to a positive DC power supply configured to selectively combine the positive portion of the corrective signal with the current signal having distortion in response to a positive distortion;
   c. a negative rectifier coupled to an output of the subtractor for determining the negative portion corrective signal; and
   d. a second controlled current source coupled to a negative DC power supply configured to selectively combine the negative portion of the corrective signal with the current signal having distortion in response to a negative distortion.

19. The electrical circuit in claim 11 wherein the circuit for selectively sinking and sourcing current comprises:
   a modulator for modulating the corrective signal, thereby forming a modulated corrective signal.

20. The electrical circuit in claim 19 wherein the circuit for selectively sinking and sourcing current comprises:
   a. a first switch coupled to the modulated corrective signal, wherein the first switch sources current to the current signal having distortion from a positive power source according to the corrective signal in response to a negative distortion; and
   b. a second switch coupled to the modulated corrective signal, wherein the second switch sinks current from the current signal having distortion to a negative power source according to the corrective signal in response to a positive distortion.

21. The electrical circuit in claim 19 wherein the circuit for selectively sinking and sourcing current comprises:
   a. a first switch coupled to the modulated corrective signal, wherein the first switch sources current to the current signal having distortion from a positive power source according to the corrective signal in response to a positive distortion; and
   b. a second switch coupled to the modulated corrective signal, wherein the second switch sinks current from the current signal having distortion to a negative power source according to the corrective signal in response to a negative distortion.

22. The electrical circuit in claim 19 wherein the modulator comprises any among a pulse width modulator, delta-sigma modulator, pulse code modulator, pulse density modulator, or pulse position modulator.

23. The electrical circuit in claim 11 wherein the circuit for selectively sinking and sourcing current comprises:
   a. a positive trigger comparator coupled to an output of the subtractor for determining a positive portion of the corrective signal;
   b. a negative trigger comparator coupled to the output of the subtractor for determining a negative portion of the corrective signal;
   c. a modulator coupled to an output of the positive trigger comparator and an output of the negative trigger comparator for pulse width modulating any among the positive portion of the corrective signal and the negative portion of the corrective signal;
   d. a first switch coupled to a positive DC power supply wherein the switch is configured to selectively combine the negative corrective signal with the current signal having distortion; and
   e. a second switch coupled to a negative DC power supply wherein the switch is configured to selectively combine the positive corrective signal with the current signal having distortion.

24. The electrical circuit in claim 23 wherein the modulator comprises any among a pulse width modulator, delta-sigma modulator, pulse code modulator, pulse density modulator, or pulse position modulator.

25. The electrical circuit of claim 23 further comprising at least one filter for filtering a modulating signal.

26. The electrical circuit in claim 11 further comprising processing means, wherein the processing means comprises:
   a. a first analog to digital converter for digitizing the current signal having distortion;
   b. a second analog to digital converter for digitizing the reference signal; and
   c. a processor for digitally subtracting the digitized reference signal from the digitized current signal having distortion, thereby forming a digitized first corrective signal.

27. The electrical circuit of claim 11, further comprising a signal generator, wherein the reference signal is generated by the signal generator.

* * * * *